US012334623B2

(12) United States Patent
Stechmann

(10) Patent No.: US 12,334,623 B2
(45) Date of Patent: Jun. 17, 2025

(54) ROOF CORRAL FOR MOUNTING OF TELECOMMUNICATIONS EQUIPMENT TO A WATER TOWER

(71) Applicant: Eric Stechmann, Nixa, MO (US)

(72) Inventor: Eric Stechmann, Nixa, MO (US)

( * ) Notice: Subject to any disclaimer, the term of this patent is extended or adjusted under 35 U.S.C. 154(b) by 172 days.

(21) Appl. No.: 18/167,675

(22) Filed: Feb. 10, 2023

(65) Prior Publication Data

US 2024/0275021 A1 Aug. 15, 2024

(51) Int. Cl.
*H01Q 1/22* (2006.01)
*H01Q 1/12* (2006.01)
*H01Q 21/10* (2006.01)

(52) U.S. Cl.
CPC ............. *H01Q 1/22* (2013.01); *H01Q 1/1228* (2013.01); *H01Q 21/10* (2013.01)

(58) Field of Classification Search
CPC ......... H01Q 1/22; H01Q 1/1228; H01Q 21/10
See application file for complete search history.

(56) References Cited

U.S. PATENT DOCUMENTS 9,252,581 B2 2/2016 Stechmann
9,577,417 B2 2/2017 Stechmann
10,808,883 B2 10/2020 Stechmann
11,274,774 B2 3/2022 Stechmann
11,746,808 B2 9/2023 Stechmann
2002/0197107 A1* 12/2002 Granata ................ F16B 5/0628 403/381
2004/0129847 A1* 7/2004 Searle ...................... E04G 3/26 248/237
2006/0180391 A1* 8/2006 Thomas ............. E04G 21/3223 182/45
2014/0027696 A1* 1/2014 Gilbert-Williams ......................... E04G 21/3214 256/64

* cited by examiner

*Primary Examiner* — Anita M King
(74) *Attorney, Agent, or Firm* — Lathrop GPM LLP; Robert J. Lambrechts

(57) ABSTRACT

An apparatus for securing hardware to a surface of a structure including two spaced apart frame members with first and second oppositely disposed end segments. First and second rod members are mounted to each of the frame members. A shoe member with a center panel and two opposed upwardly extending side walls are mounted to the lower end of each of the first and second rod members. A plate member is mounted to a lower surface of the center panel and at least one magnet is mounted to a lower surface of the plate member. Connecting members span between and interconnect each of the frame members.

49 Claims, 19 Drawing Sheets

ROOF CORRAL FOR MOUNTING OF TELECOMMUNICATIONS EQUIPMENT TO A WATER TOWER

FIELD

This disclosure relates to a magnetically mounted apparatus for securing hardware, such as telecommunications devices, to ferromagnetic structures such as water towers.

BACKGROUND

It is becoming a common sight to see some sort of antenna attached to a water tower. A water tower offers an attractive alternative location for telecommunications companies to install their equipment and it becomes a potential source of revenue to the tower owner. It was not very long ago that installation of this equipment only meant "free internet service" to the tower owner. This is changing, for the better, as tower owners are starting to see revenue for each installation and increased wireless coverage for residents.

The water tower is probably the most important piece of equipment a city or rural water district owns and with few exceptions; it is one of the most expensive pieces of equipment to maintain. If it is more difficult to safely access the tower if an antenna or cables are in the way, more will be paid for maintenance on that tower. Sometimes the added maintenance cost far exceeds any revenue gained for allowing the antenna installation in the first place. Additional maintenance costs are not the only consideration.

The potential for damage to the tower from having additional equipment installed is increased. The tower was designed to hold water. It was not necessarily designed to hold a cluster of tele-communications equipment. Wind load is greatly increased when wireless sector array antenna and radios are installed in the elevated sections of a water tower. If the installation is not correct or if proper bracing or reinforcement is not in place the risk of damage is much greater.

There may also be warranty considerations regarding the tank's coatings. If the coating is still under warranty and a telecom installer is allowed to weld his equipment in place, this damage will alter and may even void any coating warranty. This could be economically unsound especially if there is an extended coating warranty. Even if a city or rural water district has no warranty issues, is the installer going to properly repair any coating damage? What about damage to the interior coating? Is the installer going to properly repair the interior coating? Is the installer going to sanitize the interior after repairing the coating? Is the installer even qualified to do this? It is imperative that these questions be asked, and the system decision makers are satisfied that an antenna installation is going to be done correctly.

Improper antenna installations include, among others (i) openings cut in the roof compromises the sanitary integrity of the tank contents, (ii) cables improperly mounted to ladders, across access openings, or on platforms create OSHA and safety-related deficiencies, (iii) cables, mounting devices, antenna brackets, and antennas themselves can hamper access to vents and manholes. In addition to the sanitary and safety deficiencies caused by improper (or underperformed) touch-up painting after the antenna is installed can lead to premature coating failure on the interior and exterior of the tank. Additionally, cables, antennas, and mounting devices placed too close to the tank and appurtenances can make it difficult, if not impossible, to clean and paint behind them A major consideration for the co-location of telecommunications equipment being installed on a welded structure on the top of a water tower is the heat induced weld burning that takes place on both the exterior and interior of the tower coatings. The exterior portion of the coatings is easily accessible and may receive coatings repair with the application of grinding, surface preparation and application of both the primer coating and top coatings. However, the interior coatings are subjected to enough heat from the welding process that the associated areas will also burn. This presents a fire hazard as-well-as dozens of individual breaks in the protective qualities of the coatings.

Also of concern is the fact that these burned coatings, composed of synthetic chemicals, are in direct contact with the public drinking water supply. The chemical vapors and solid debris may be distributed into the body of contained water and subsequently released into the public water supply. Properly repairing these areas requires the complete isolation of the tower from the water distribution system and wasting of the revenue generating water supply. The water from the tower is released into the environment where disinfectant chemicals may cause a downstream negative affect on aquatic wildlife.

These types of repairs also render the water tower as non-effective as an emergency water storage supply should a fire suppression emergency occur. The upper sections of a water tower interior roof are also the most difficult area to access for repairs, requiring the erection of scaffolding in a curved, confined and dimly illuminated area. These complex issues have led to many contractors concluding that they should not tell the tower owner about this welding damage, for fear that their repair costs would rise or that the tower may become off-limits to the completion of the wireless installation project.

There may also be structural problems that can be caused by antenna installation to include improper cable penetrations that can cause damage to the tank. Improperly mounted brackets or antennas can create a potential liability should high winds, ice loading, seismic activity, or other similar events cause the installation to fail, damaging the tank or surrounding property, or endangering individuals. Brackets screwed directly into tubular columns can cause interior column corrosion. Improperly designed brackets can buckle the tank during high winds.

Most designers and installation contractors have little experience with water tank design and maintenance. Therefore, simple items to prolong the life of the coating system or avoid potential sanitary, structural, or safety problems are often overlooked. There exists a great need to simplify the installation of telecommunications equipment and to minimize activities that are destructive to the water tower and hazardous to those charged with maintaining the tower.

SUMMARY

The apparatus as disclosed herein is directed to a magnetic roof corral structure that is designed to be an alternative to penetrative methods, such as grinding and welding a steel structure onto the roof of a water tower. This apparatus uses a plurality of quality high-strength rare earth magnets along with several other technologies to allow multiple wireless carriers to be easily and rapidly co-located onto a water tower roof.

Water tower owners have had increased scrutiny over the methods and types of wireless installations onto the structure of water towers in recent years. Traditionally grinding and welding a steel roof corral was one of the only methods for creating a structurally rigid placement of telecommunications equipment. However, new generation water tower coatings are much more expensive and tower owners are hesitant to allow grinding and welding onto their tower.

The act of welding a roof structure onto a water tower roof necessitates the abrasive removal of many multilayer coating system areas including top coating, penultimate mid coating, and primer coatings. This breach in coatings quality and thickness, even after touch-up applications, can act as a serious cause of corrosion and potential steel loss. The welding heat induced into the tower roof exterior causes the obverse interior coating systems to burn away from the steel.

These areas of burned coatings are extremely difficult to repair and requires the tower to be shut town from a municipal water supply, drained, rigged, touched-up, re-sanitized and filled with water again. Draining the tower of water can cause secondary issues such as a reduced water capacity and pressure for the users and needs for emergency fire management. The repair costs and non-revenue generated water loss is of great concern and frustration to the carriers and the tower owners alike. By placing a high strength magnetic roof corral onto a water tower roof, these complexities and costs are eliminated.

The apparatus for securing hardware to a surface of a structure as disclosed herein includes a plurality of spaced apart frame members with first and second oppositely disposed end segments. A typical configuration of the disclosed apparatus will contain between one and ten frame members. When more frame members are utilized, the apparatus is generally disposed within a circular configuration of generally 25 to 35 feet in diameter; however, smaller, and larger diameter configurations are also contemplated by this disclosure.

Each of the frame members is connected to an adjacent frame member by at least one and preferably several connecting members. The connecting members are preferably tubular structural steel members that are precision formed to the desired curvature using, for example, a mandrel. The precision curved connecting members are each received into a through hole in the frame member with a preferred embodiment utilizing two connecting members passing through two lower openings in the frame member and a third connecting member passing through an elevated opening in the frame member.

As previously noted, a typical diameter of the disclosed apparatus is in the range of 25-35 feet with generally eight frame members being utilized for the fully assembled apparatus. The sector span between each frame member is preferably about 45 degrees and a preferred embodiment provides for an open sector, i.e., no connecting members between two adjacent frame members, to allow access to an interior space of the apparatus to provide for maintenance and inspection of the apparatus.

The metal frame members are preferably triangular shaped and ideally have material removed, in the form of a cutout, that serves to mitigate cross-wind loading, surface area for ice accumulation and lessens the overall weight of the apparatus. L-shaped stiffeners are also preferably employed that extend along the edges of the cutout area and are secured to the frame member with threaded fasteners, alternatively these stiffening members may be weld fastened. These stiffeners improve overall rigidity and load-path performance.

The apparatus as disclosed herein also includes first and second rod members mounted to each of the plurality of frame members at the first and second oppositely disposed end segments, the first and second rod members each have an upper and a lower end. The rod members are preferably tubular and fabricated from structural steel. The rod members are preferably attached to the end segments using one or more U-bolts effectively capturing the rod members in position but allowing for changes in vertical position upon the loosening of the U-bolts. This adjustability of the rod members is highly beneficial because the surface of the structure to which the apparatus is secured may not be perfectly symmetrical and may have surface imperfections or perturbations that need to be accommodated by changing the elevation of the rod members.

The apparatus also includes shoe members with a center panel and two laterally opposed upwardly extending side walls. The shoe member is mounted to the lower end of each of the first and second rod members. The shoe member is preferably fabricated from stainless steel. The upwardly extending walls are preferably hydraulic press-formed upwardly from the center panel and each wall includes a plurality of through holes and slots therein. A first through hole in both upwardly extending walls is aligned with a through hole in the rod member and they are configured to receive a fastener, pin, or rod to retain the shoe member in position on the rod member. Several through holes are preferably positioned adjacent one another to allow the installer to select the most optimum through holes in the shoe walls and affix the rod member to accommodate the mounting surface and associated obstructions to which the translation of the shoe member would alleviate surficial impingement.

Additionally, positioned above the first through hole in the upwardly extending walls of the shoe member is a longitudinally extending slot. The slot is intended to accommodate pitch angle in the mounting surface. A fastener, pin or rod is passed through the slot in each wall and through an opening in each rod member and an appropriate retention mechanism is applied to the fastener, pin, or rod to prevent inadvertent release of the retention mechanism. The positioning of the slot above the fastener in the first through hole facilitates the rotation of the shoe member. Once the shoe member is optimally positioned the retention mechanisms can be employed to lock the shoe member in position.

Disposed beneath the center panel of the shoe member is a plate member mounted to a lower surface of the center panel. The plate member is preferably fabricated from stainless steel and at approximately a longitudinal midline a cutout in the plate member is formed. The cutout allows the plate member to be manually bent to allow the plate member to follow the contour of the surface of the structure to which the apparatus is being mounted. The plate member is preferably secured to the shoe member with a plurality of threaded fasteners.

A plurality of high strength rare earth magnets is mounted to a lower surface of each plate member. The secure mounting is accomplished with threaded fastener members on each magnet that pass-through openings in the plate member. A locking nut is then applied to the threaded member securing the magnet in place. It is contemplated that as many as 1,500 to 2,500 individual magnets are secured in position considering all the shoe members (also referred to as magnetic assemblies) mounted to the frame members of the apparatus.

In addition to the openings in the plate member for individual magnets there are also threaded openings for controlled installation and removal of the robust magnet assemblies on each shoe member. A plurality of threaded separation members that include a biasing tip are used to incrementally allow engagement/disengagement of the magnets to and from the ferromagnetic surface of the structure.

The biasing tips on the separation members are preferably an engineered polymer that does not cut or scratch the epoxy coating applied to protect the surface of the structure. The engineered polymer compresses and spreads the load at the tip of the threaded separation member caused by the magnetic attraction.

As previously disclosed, the apparatus also requires a plurality of connecting members spanning between and interconnecting each of the frame members. In a preferred embodiment, these connecting members are received into three separate openings in the frame members. The connecting members are preferably fabricated from structural steel tubes and joined to an adjacent connecting member. Prior to the joining of the adjacent connecting members, a plug with roughly the same inner diameter as the connecting member is used to hermetically seal the member so that moisture and oxygen cannot accumulate inside the tube causing corrosion to the interior of the metal tube members.

A series of straight cross brace tube members physically constrain the three connecting members of the preferred embodiment to prevent excessive buckling or bending of the connecting members. These bracing tube members provide rigidity to the three curved frame-connecting members when loads are applied by the installation of telecommunications equipment onto the radially exterior portions of the corral structure.

The open lattice structure of the disclosed apparatus facilitates observation and recording of the condition of coatings, spot maintenance and power washing. The open lattice configuration mitigates crosswind environmental loadings and less overall surface area for ice accumulation. The open lattice configuration also mitigates shade and moisture build-up that may induce the growth of mold and mildew. Moreover, each "pie-wedge" apparatus section is fungible and can be readily assembled with these interchangeable sections.

It is an object of the apparatus as disclosed herein to accommodate a wide range of telecommunications hardware for attachment to the apparatus.

It is a further object of the apparatus as disclosed herein to provide a wide array of magnetic pad adjustment features to accommodate roof curvature and hardware already existing on the roof structure.

It is a further object of the apparatus as disclosed herein to securely mount the apparatus to the roof of the tower with a high level of confidence that powerful wind events will not dislodge the apparatus.

It is a further object of the apparatus as disclosed herein to provide a modular configuration that can be tailored to the needs of any tower roof whether requiring a full circular configuration or can utilize as few as two frame members with connecting members spanning therebetween.

It is a further object of the apparatus as disclosed herein to provide a relatively low profile, thereby limiting loads induced by powerful wind events, with an apparatus elevation of preferably no greater than about 45 inches.

It is a further object of the apparatus as disclosed herein to accommodate co-locating a plurality of antenna and a plurality of wireless carrier frequency bands on the same apparatus with various horizontal offsets for the antenna.

It is a further object of the apparatus as disclosed herein to provide at least five degrees of freedom of movement of the shoe members to optimize the surface connectivity by allowing rotation and translation of the magnet members around surficial obstructions of the assembled apparatus when atop the tower roof in the event of the need to accommodate surface fluctuations or obstructions atop the roof.

It is a further object of the apparatus as disclosed herein to provide an assembly preformed for optimization of performance associated with environmental loadings as well as overall weight reduction of the apparatus and assembly in the field.

It is a further object of the apparatus as disclosed herein to provide a fully assembled apparatus at ground level for lifting into position upon the roof of a water tower.

It is a further object of the apparatus as disclosed herein to provide for an alignment of the magnetic assemblies that is matched to the tower tangency in two directions.

It is a further object of the apparatus as disclosed herein to allow for optimal alignment of the exterior perimeter magnetic assemblies through flexure.

It is a further object of the apparatus as disclosed herein that the two magnetic assemblies of each frame are cooperable to span an obstacle along the plane of each magnetic assembly.

It is an object of the apparatus as disclosed herein for the frame members to be matched to the tangency of the tower roof.

Various objects, features, aspects, and advantages of the disclosed subject matter will become more apparent from the following detailed description of preferred embodiments, along with the accompanying drawings in which like numerals represent like components. The contents of this summary section are provided only as a simplified introduction to the disclosure and are not intended to be used to limit the scope of the appended claims.

The contents of this summary section are provided only as a simplified introduction to the disclosure and are not intended to be used to limit the scope of the appended claims.

DETAILED DESCRIPTION

The disclosed technology is directed to an apparatus for securing hardware to a structure through various attachment mechanisms. By using torsional deflection of joints fabricated within the apparatus itself, the apparatus can align the selected attachment mechanism to the topography of the surface of the structure. The surface of the structure can be flat, stepped, concave, convex, or form any number of angles.

Figure 1:
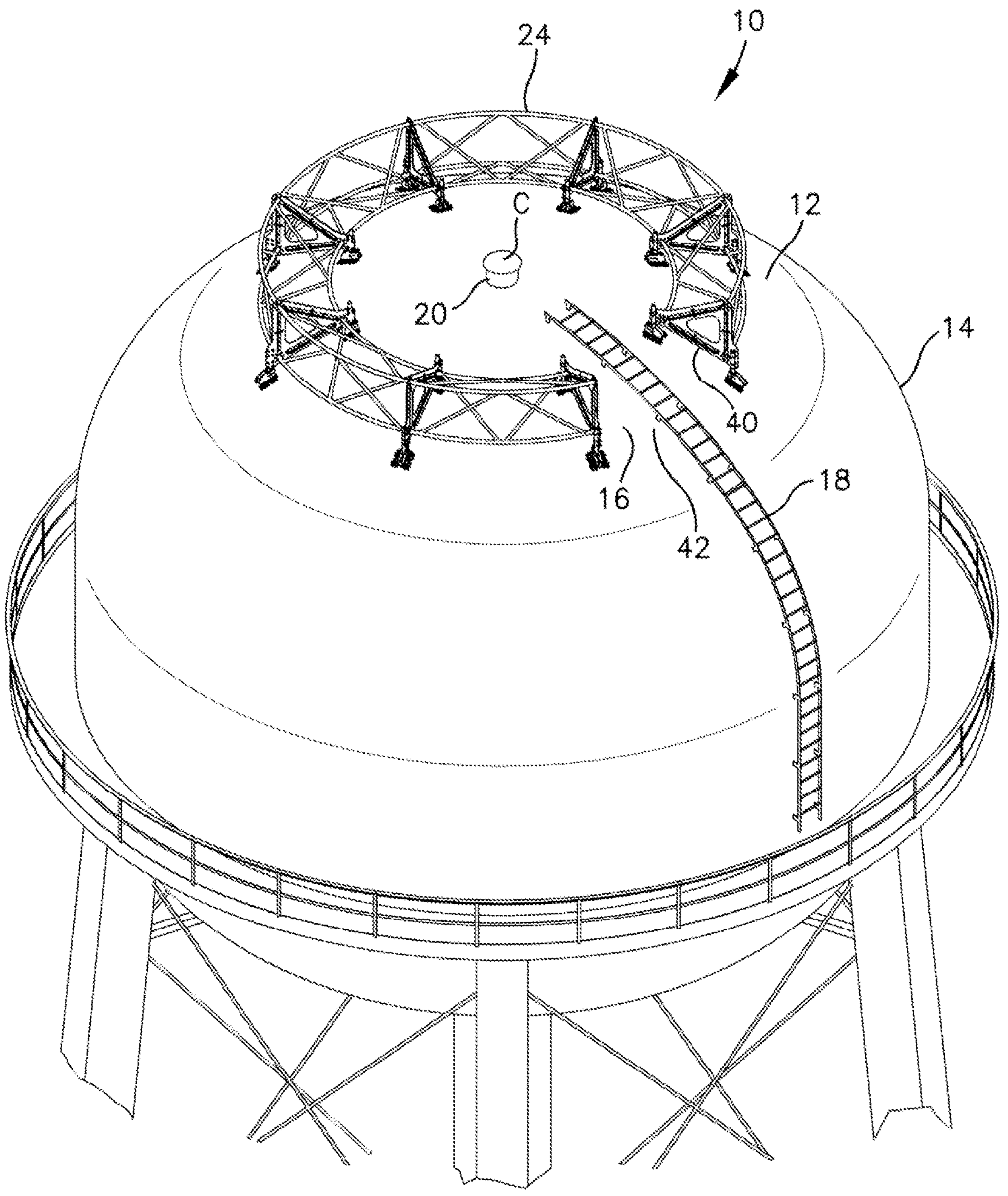
FIG. 1 illustrates a perspective view of an embodiment of the apparatus secured to the surface of a water tower structure.
Figure 2:
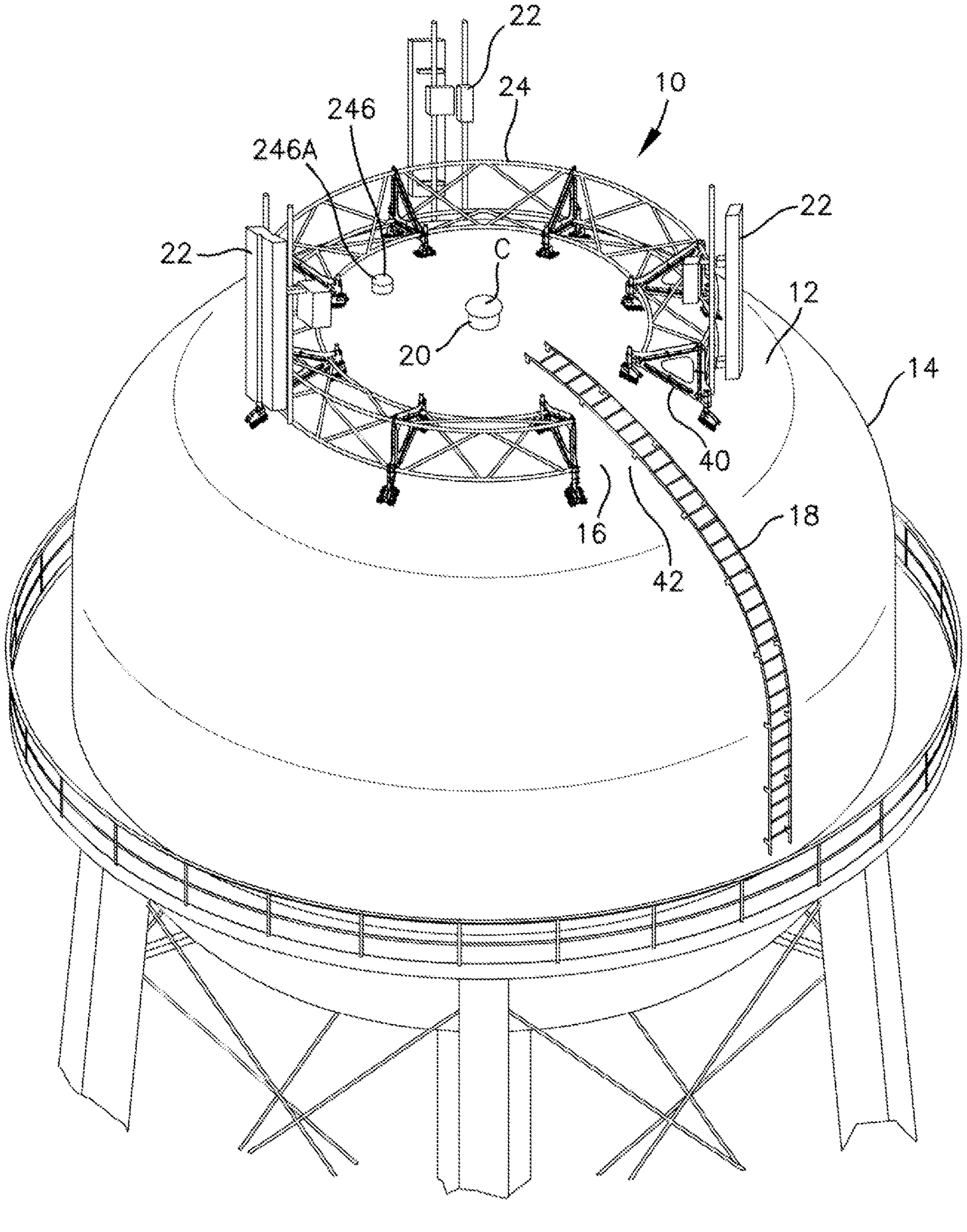
FIG. 2 illustrates a perspective view of an embodiment of the apparatus secured to the surface of a water tower structure with associated hardware attached.

FIG. 1 illustrates the disclosed apparatus 10 or roof corral, positioned atop a roof 12 of a water tower 14. Also shown in FIG. 1 is an access route 16 with ladder 18 and the center area 20 of the apparatus 10. FIG. 2 illustrates various hardware components 22 mounted to the connecting members 24 of the apparatus. The hardware components 22 may include satellite dishes, directional antennas, stick antennas, cellular panels, banners, lighting fixtures, cable trays, and rigging for maintenance purposes. Because the apparatus provides the capacity to implement varying horizontal offsets above the connecting members 24 a plurality of antenna transmitting and receiving a plurality of wireless frequency bands are operable for co-location upon the apparatus 10.

Figure 3:
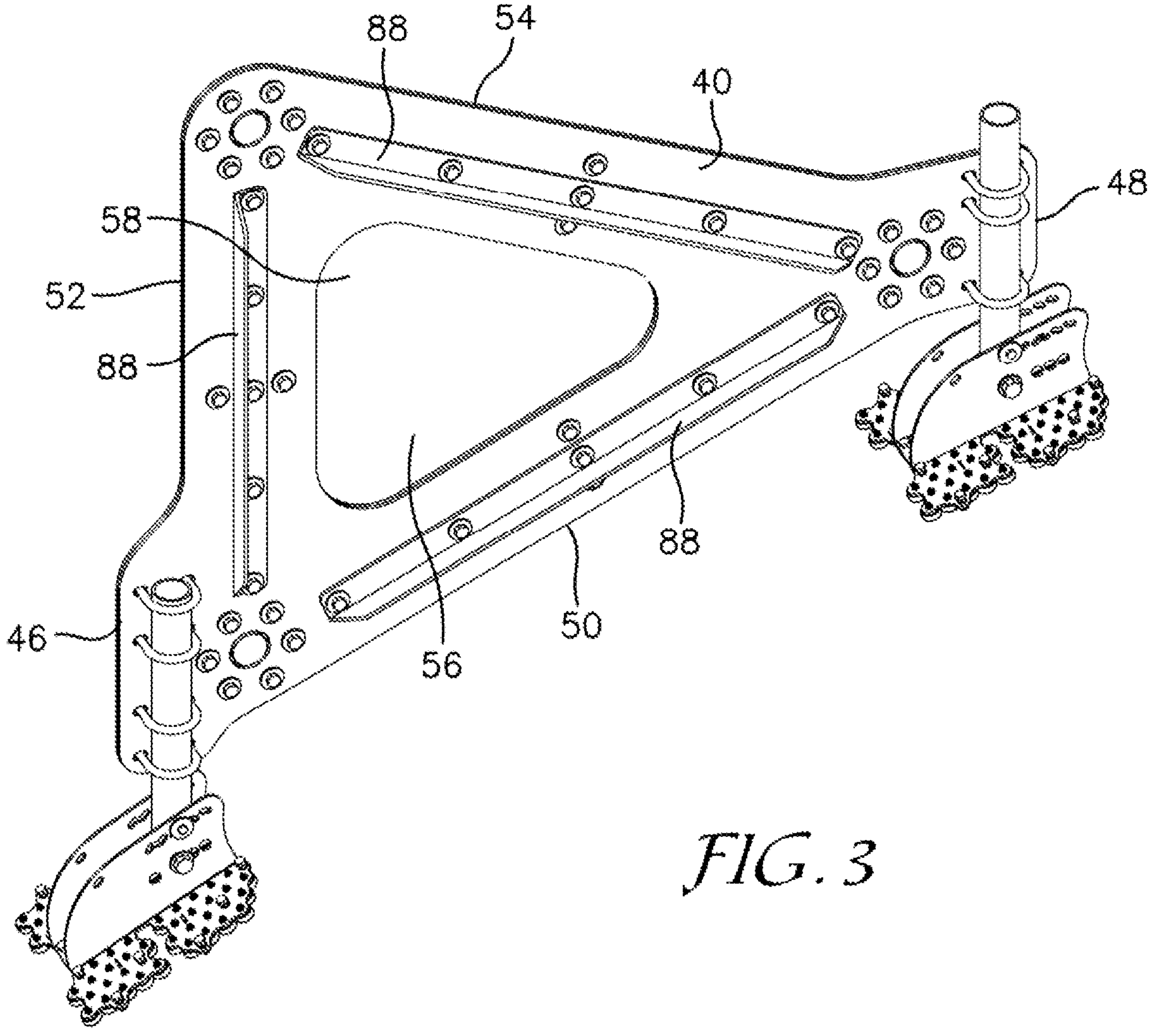
FIG. 3 illustrates an exploded view of an embodiment of a frame member.

FIG. 3 illustrates an embodiment of an exemplary frame member 40. The apparatus 10 includes a plurality of frame members 40 arranged in a circular fashion as best illustrated at FIG. 1. In the exemplary embodiment, the frame members 40 are positioned approximately every 45 degrees from an adjacent frame member with a single 45-degree sector 42 unobstructed by connecting members 24. This unobstructed sector 42 is available for access by a ladder 18. The ladder being utilized to allow inspectors, or maintenance personnel, to move toward the center area 20 of the roof 12 of the water tower 14. Each of the frame members 40 of the apparatus 10, whether the apparatus consists of 2 or 10 frame members 40, is aligned with a center point C of the roof 12 of the tower 14. This center point C alignment of the frame members 40 optimizes the future increased capacity of the apparatus 10. Maintaining a center point C alignment allows the addition of new frame members 40 that in-turn can support additional telecommunications hardware 22.

In an exemplary embodiment, the frame member 40 is fabricated in a roughly triangular shape and includes oppositely disposed end segments 46, 48 proximate the lower span of the frame member. The frame member includes a lower horizontal edge 50, a vertical edge 52 and a sloped edge 54. To reduce weight, the centroid 56 of the frame member 40 is preferably removed leaving a triangular shaped opening 58.

Figure 4:
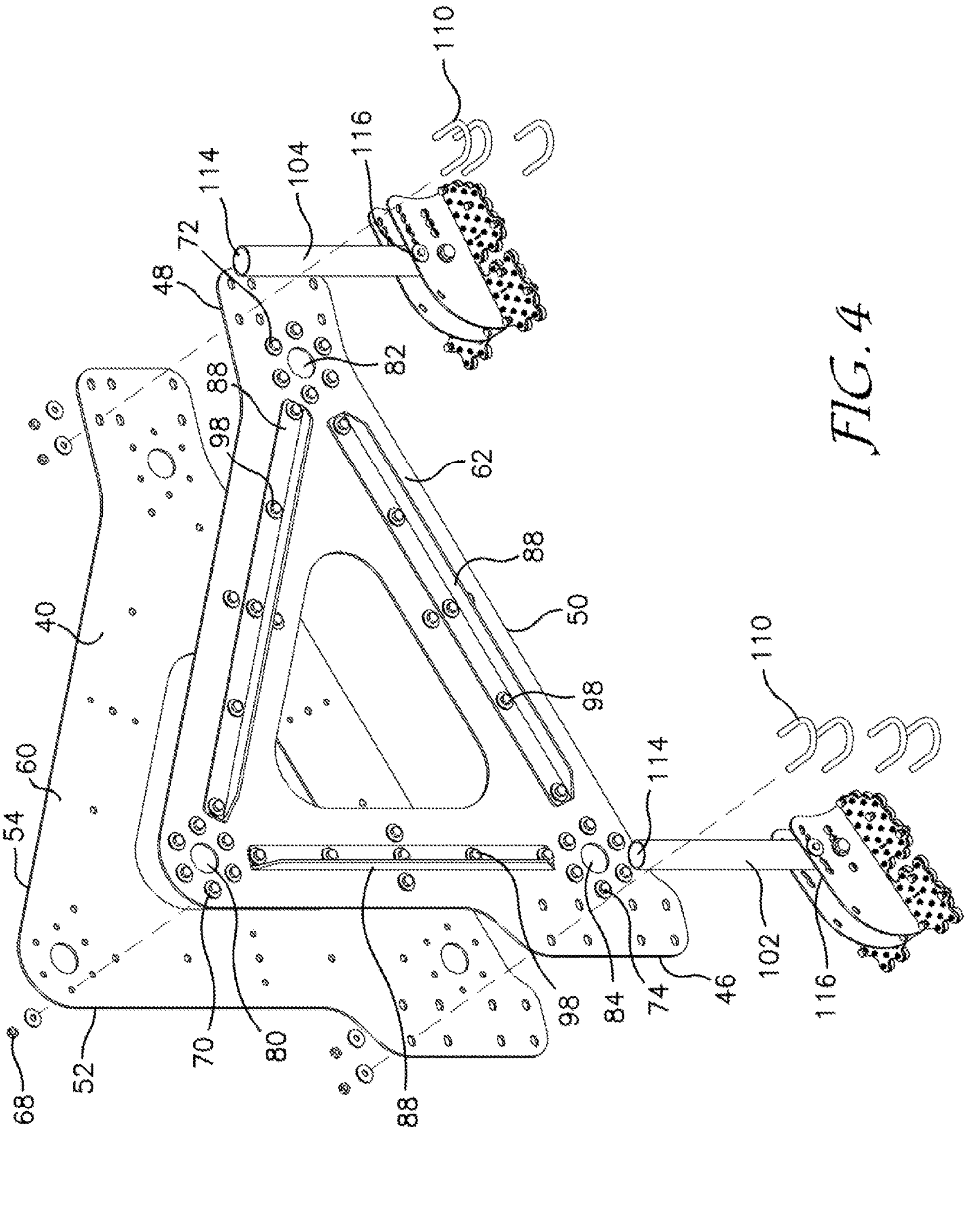
FIG. 4 illustrates an exploded view of an embodiment of a frame member utilizing back-to-back plates.

In one embodiment of the frame members 40, the frame member utilizes a pair of identical structural steel frame plates 60, 62 that are sandwiched together back-to-back as illustrated at FIG. 4. The doubling of the frame plates provides additional structural rigidity that is particularly beneficial when heavier hardware components 22 are mounted to the connecting members 24 of the apparatus 10. The back-to-back frame plates 60, 62 are securely fastened to one another with a plurality of threaded fasteners 68. A circular pattern of fasteners 70, 72, 74 are positioned around each of the three through holes 80, 82, 84 in the frame member 40. This circular pattern of fasteners 70, 72, 74 provides supplemental structural support to the frame member 40 at the three areas of highest loading where the connecting members 24 pass through the frame member 40.

As further illustrated at FIGS. 3 and 4 in a preferred embodiment, three stiffening ribs 88 are mounted to the frame member 40 proximate the edges 90, 92, 94 of the triangular shaped opening 58. These stiffening ribs 88 are preferably L-shaped mild steel members secured by passing threaded fasteners 98 through the frame member 40 to the opposite side of the frame member and securing another stiffening rib 88 in the same position on the other side. Alternatively, the stiffening members may be welded to the frame members. Because of the L-shaped cross-section of the ribs 88, bending of the ribs along a longitudinal axis requires a tremendous amount of force and therefore the ribs will serve to prevent bending and buckling of the frame members 40.

The oppositely disposed end segments 46, 48 provide an area for mounting of the first and second rod members 102, 104. The rod members are preferably round tubular members fabricated from structural steel that are positioned against the end segments 46, 48 as best illustrated at FIG. 3. It is however, contemplated by this disclosure that the rod members may also be in the shape of an I-beam, a square member or other cross section configuration and that the term “rod” should not be construed to be limited to a circular member. The rod members 102, 104 are held securely in position against the end segments with a plurality of U-bolts 110 that pass through the end segments of the frame member 40. Generally, three or four U-bolts 110 are sufficient to retain a rod member 102, 104 in position; however, increased loads upon the apparatus 10 may require an increase in the number of U-bolts.

A critical benefit of the U-bolts is that depending upon the condition and curvature of the roof 12 of the water tower 14 the rod members 102, 104 may be extended or retracted through the untightened U-bolts 110 as necessary to accommodate the conditions of that specific water tower. In other words, the rod members 102, 104 may be slid up or down to allow the points of contact (discussed further below) to change to accommodate weld seams, increased roof curvature and roof structural features that could potentially interfere with positioning of the apparatus 10. Once the desired elevation of the rod members 102, 104 is achieved then the U-bolts 110 are tightened into position thereby securing the rod members against the end segments 46, 48. The rod members 102, 104 each have an upper end 114 and a lower end 116. The upper end 114 of each rod member remains unattached while the lower end 116 is mounted to additional components.

Figure 5:
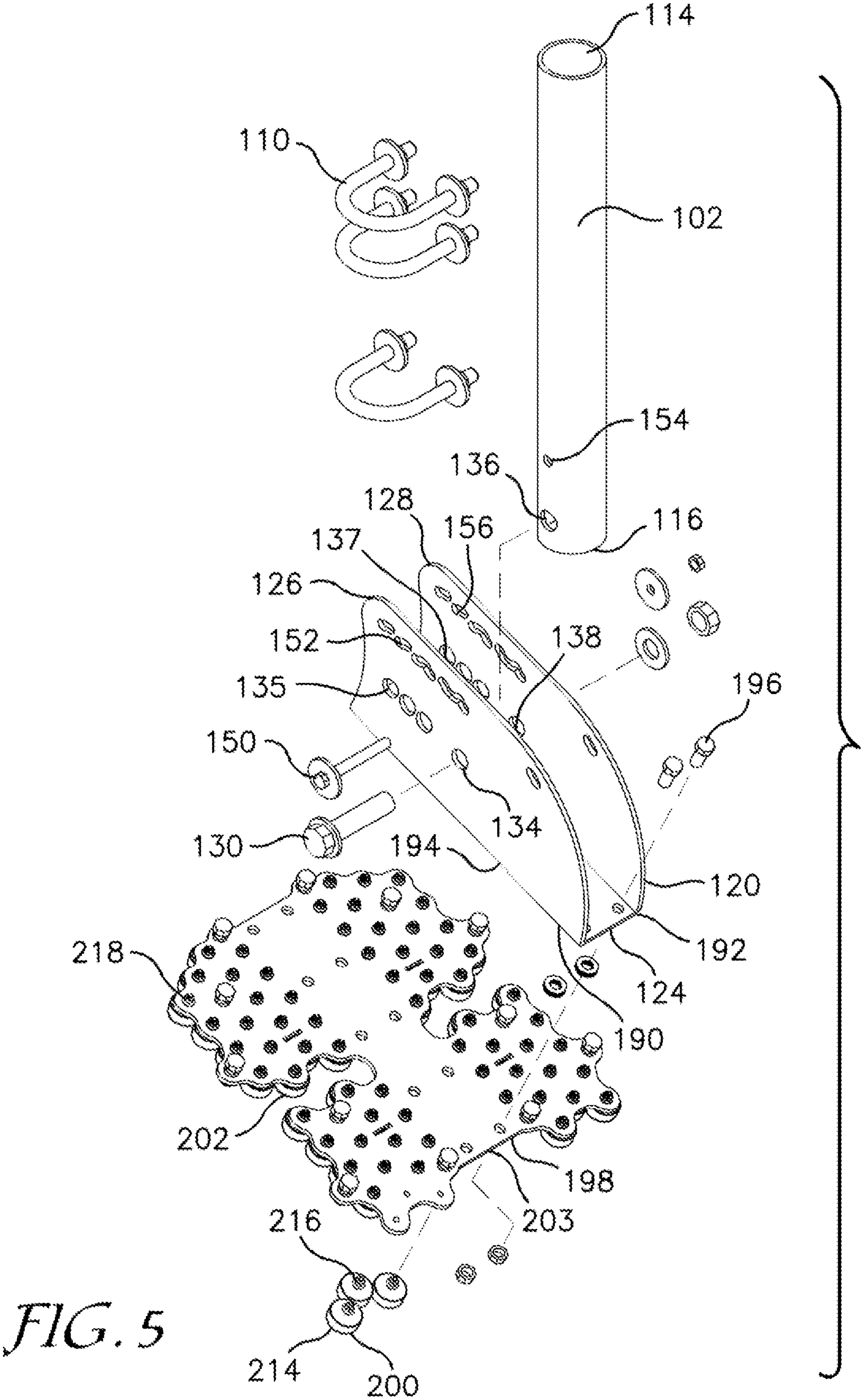
FIG. 5 illustrates an exploded view of an embodiment of the magnetic assembly including the first rod and shoe member.
Figure 5A:
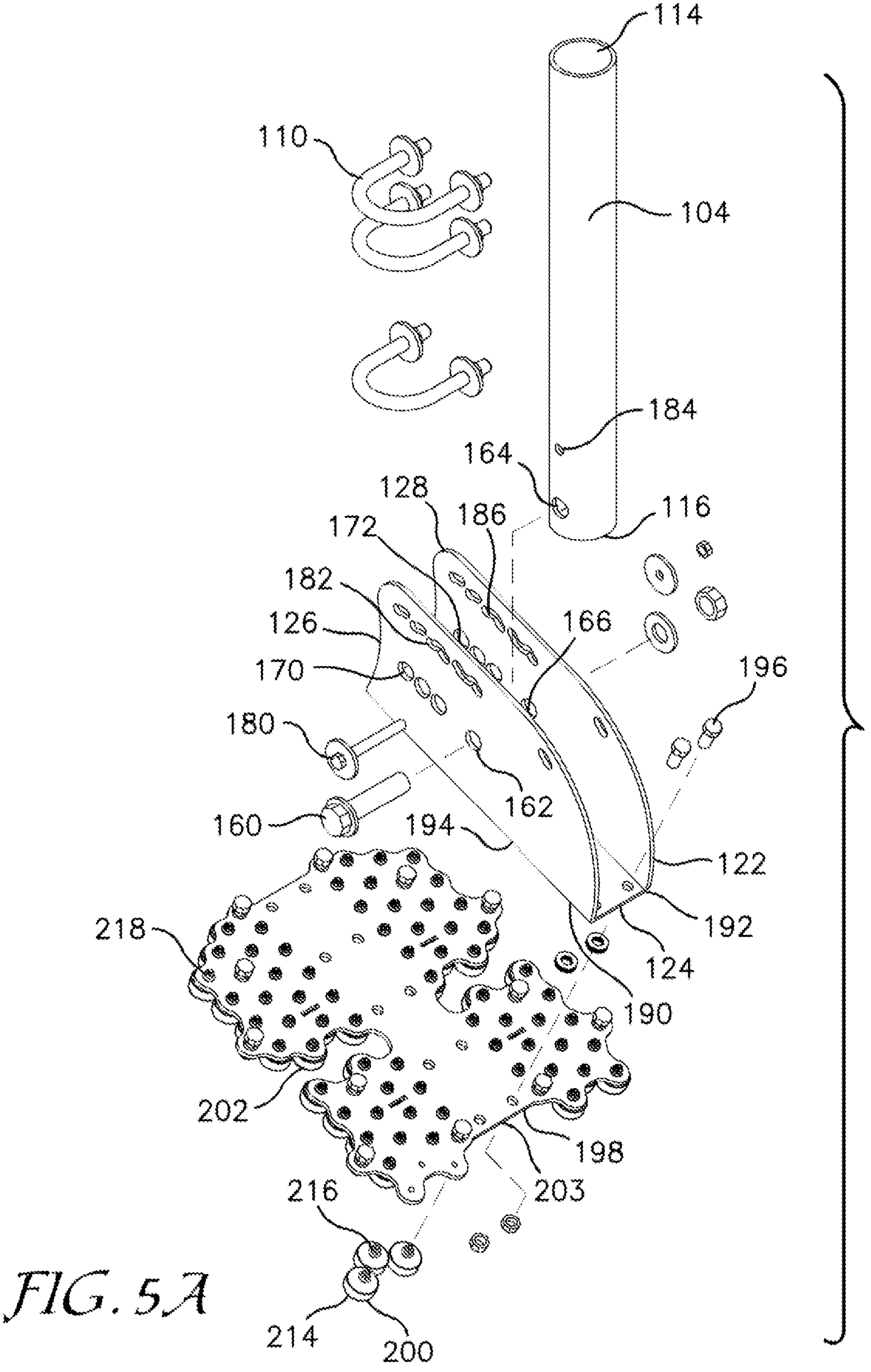
FIG. 5A illustrates an exploded view of an embodiment of the magnetic assembly including the second rod and shoe member.

As illustrated at FIGS. 5 and 5A, the lower end 116 of the rod members 102, 104 are each disposed within a shoe member 120, 122 that includes a center panel 124 and two opposed upwardly extending side walls 126, 128. The shoe members 120, 122 are mounted proximate the lower end 116 of each of the first and second rod members 102, 104. The mounting of the first shoe member 120 to the first rod member 102 is accomplished with a fastener 130 that passes through openings 134, 136, 138 in the first wall 126, the rod member 102 and the second wall member 128.

To further facilitate alignment of the shoe member 120 with the roof 12 of the tower 14 a preferred embodiment includes multiple adjacent openings 135, 137 in the first and second upwardly extending sidewalls 126, 128. These adjacent openings 135, 137 allow the installer to select the optimal opening for the fastener 130 to again accommodate the slant of the roof 12 of the tower 14 and accommodate other obstacles that may exist upon the roof 12.

A second fastener 150 is also passed through openings 152, 154, 156 in the upwardly extending walls 126, 128 and the first rod member 102 at an elevation slightly higher than the first fastener 130. The openings 152, 156 are slots that allow the shoe member 120 to rotate about the fixed second fastener 150. In an exemplary embodiment the first shoe member 120 is capable of rotating about 10 degrees on both sides of horizontal. The second fastener 150 is stabilized in position within the opening 154 of the first rod member 102. Once the desired angular orientation of the shoe member 120 is achieved the first and second fasteners 130, 150 are tightened to the specified torque level.

The mounting of the second shoe member 122 to the second rod member 104 is accomplished in much the same fashion as with the first shoe member 120. As illustrated at FIG. 5A, a first fastener 160 passes through openings 162, 164, 166 in the first wall 126, the rod member 104 and the second wall member 128. To further facilitate alignment of the shoe member 122 with the roof 12 of the tower 14 a preferred embodiment includes multiple adjacent openings 170, 172 in the first and second upwardly extending sidewalls 126, 128. These adjacent openings 170, 172 allow the installer to select the optimal opening for the fastener 160 to again accommodate the slant of the roof 12 of the tower 14 and other obstacles that may exist upon the roof 12.

A second fastener 180 is also passed through openings 182, 184, 186 in the upwardly extending walls 126, 128 and the first rod member 102 at an elevation slightly higher than the first fastener 130. The openings 182, 186 are slots that allow the shoe member 120 to rotate about the fixed second fastener 180. In an exemplary embodiment the first shoe member 120 is capable of rotating about 10 degrees on both sides of horizontal. The second fastener 180 is stabilized in position within the opening 184 of the second rod member 104. Once the desired angular orientation of the shoe member 120 is achieved the first and second fasteners 160, 180 are tightened to the specified torque level.

As previously discussed, the shoe members 120, 122 include a center panel 124 and side walls 126, 128 that extend upwardly from the laterally opposed edges 190, 192 of the center panel 124. Disposed beneath and secured to the lower surface 194 of the center panel 124 with fasteners 196 are plate members 198. As best illustrated at FIGS. 5 and 5A, the plate members 198 serve as the mounting base for a plurality of high-quality magnets 200 wherein the tops and sides of each individual magnet in the plurality of magnets 200 are encased in a hermetically sealed socket such as with an epoxy.

The preferred magnets are fabricated from the rare earth metal neodymium. Each plate member 198 is preferably fabricated from stainless steel to eliminate magnetic attraction of the plurality of magnets that are mounted thereto and mitigating surface corrosion. It is also contemplated by this disclosure that a single large powerful magnet may be employed as opposed to a plurality of high-quality magnets.

As illustrated at FIGS. 5 and 5A, the plate members 198 also preferably include a cutout 202 at the midline area 204 on both sides of the plate member 198. The cutout 202 facilitates the bending of the plate member 198 by either manual or machine assisted means should there be a need to further conform the plate member 198 to the curvature of the roof 12 to which the apparatus 10 is attached. A plurality of fasteners 196 are used to secure the plate member 198 to the center panel 124.

As illustrated at FIGS. 5 and 5A, a plurality of individual magnets is secured against the lower surface 203 of the plate member 198. Each magnet 214 includes a threaded shaft 216 that passes through the plate member 198 and is secured in position with a nut 218. The plate member 198 also includes a plurality of through holes 222 that are used to facilitate the attachment and removal of the magnet laden plate member 198 to the roof 12 of the tower 14.

The hardware components 22 mounted to the apparatus 10 may be subject to what is known as passive intermodulation (PIM). The PIM is a type of intermodulation distortion that occurs in passive, non-linear components in wireless systems. Passive components are those components which do not require electrical power to operate. Examples of RF passive components include power dividers/combiners, couplers, terminations, coaxial connectors, and cables. Oxidation, internal resistance, or other effects in passive components can cause the generation of a non-linearity. Non-linearity of components also tends to increase with age. To prevent, or at least minimize PIM, the magnetic shoes 120, 122, center panels 124 and side walls 126, 128 may optionally be coated with a radar absorbing coating. Additional components such as the rod members 102, 104 may also be coated with these materials to further prevent undesirable interference.

Figure 5B:
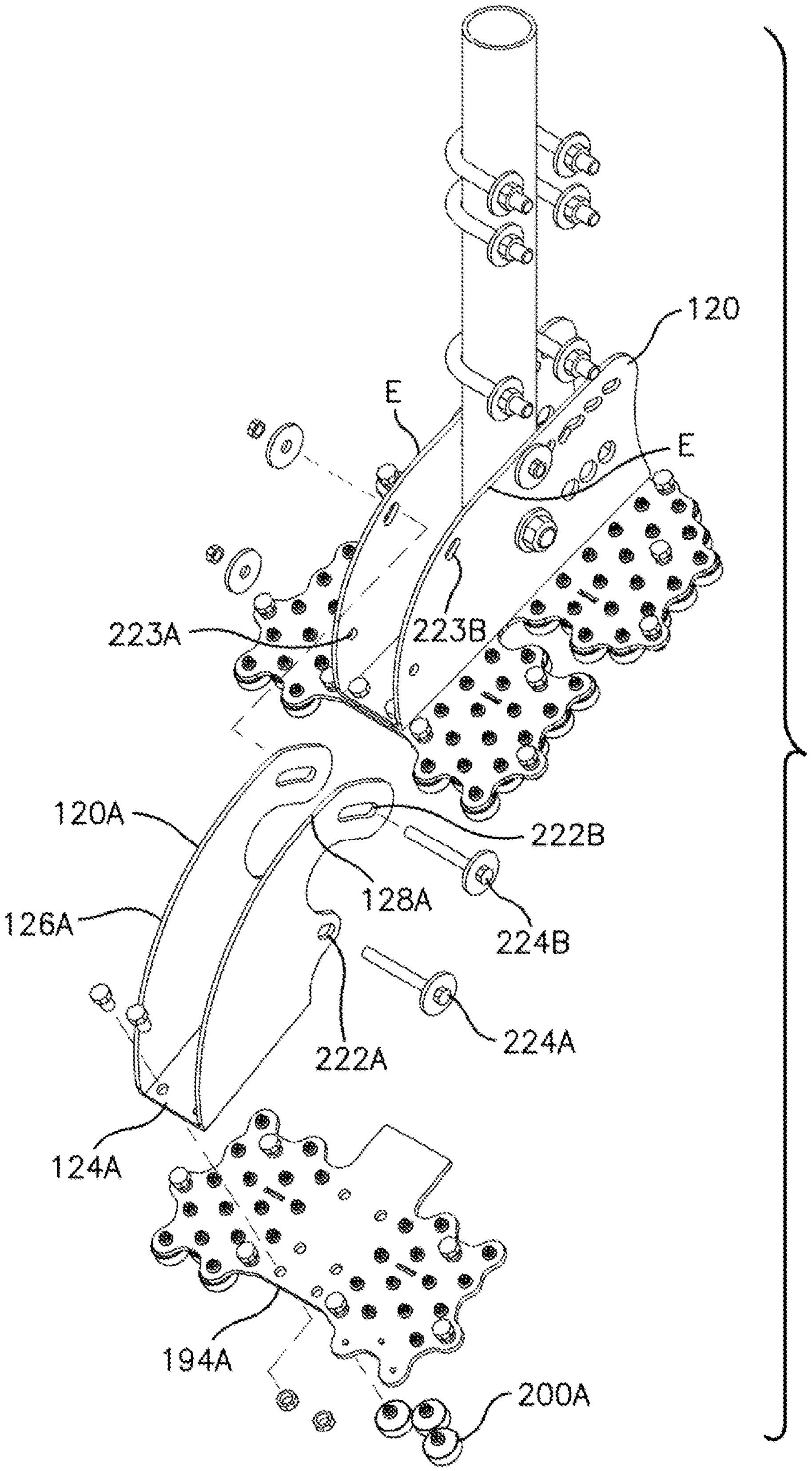
FIG. 5B illustrates a partial exploded view of an embodiment of an auxiliary shoe member.

If additional hardware components 22 are attached to the apparatus 10 after the initial installation date, there may exist a need to increase the power of the magnetic attraction of the apparatus 10 to the roof 12 of the tower 14. Disclosed herein is an auxiliary connection system that increases the total strength of the magnetic attraction. FIG. 5B illustrates an auxiliary shoe member 120A with a center panel 124A, and side walls 126A, 128A as well as a plurality of magnets 200A mounted to the lower surface 194A of the center panel 124A. The arcuate side walls 126A, 128A of both auxiliary shoe members (auxiliary shoe members 120A, 122A may be secured indirectly to one or both rod members 102, 104) include lower openings 222A and upper openings 222B. The lower openings 222A are circular in configuration while the upper openings 222B are curved slots that span approximately 20 degrees from end to end.

As illustrated at FIG. 5B, the existing shoe member 120 also includes circular openings 223A passing through the side walls 126, 128 proximate the center panel 124 and slotted openings 223B near the upper edge E of each of the side walls 126, 128. The auxiliary shoe member 120A is mounted to the existing shoe members 120 by passing fasteners 224A, 224B through openings 222A, 223A, 222B, 223B but are not initially tightened into position.

Because the upper openings 222B, 223B are curved slots, the auxiliary shoe members 120A may be rotated (about fastener 224A) to accomplish alignment with the roof 12 of the tower 14. Once the auxiliary shoe member 120A is fully aligned with the roof 12, the fasteners 224A, 224B are tightened into position effectively transferring the increased holding power of the auxiliary shoe member 120A from each of the supplemental magnet sets 200A to the apparatus 10. This assembly process may also be repeated for shoe member 122 and auxiliary shoe member 122A. Auxiliary shoe members 120A, 122A may be used on both shoe members, only the front or only the rear shoe members to enhance the holding power of the apparatus 10 to the roof 12 of the tower 14.

Figure 6:
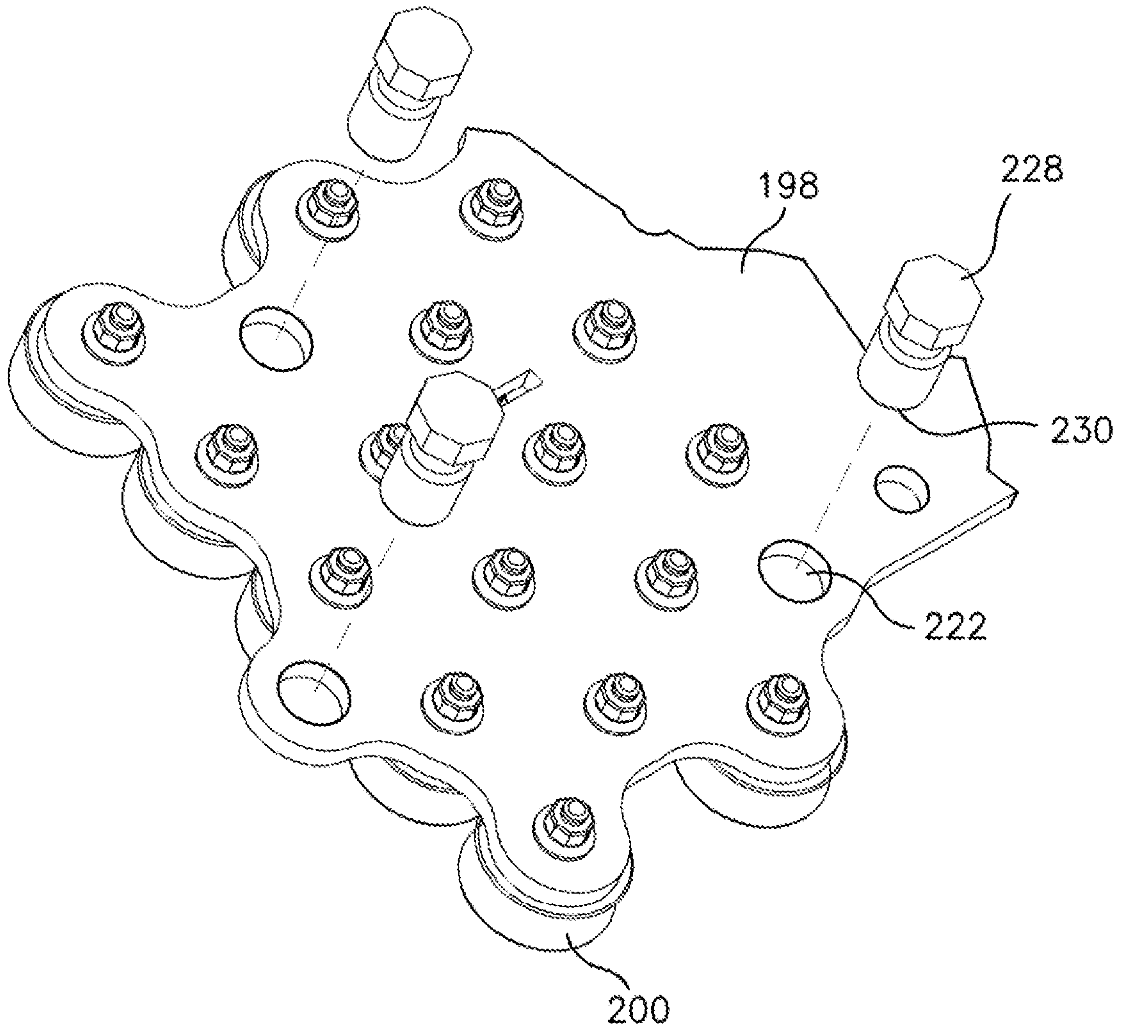
FIG. 6 illustrates a perspective view of an embodiment of a threaded separation tool with a biasing tip.

As best illustrated at FIG. 6, the threaded through holes 222 facilitate the advancement of a threaded separation tool 228 with a biasing tip 230. When a plurality of these threaded separation tools 228 are advanced into the threaded through holes 222 of the plate member 198 and the compliant tip extends a sufficient distance beneath the lower surface of the plurality of magnets 200 the biasing tip 230 is the first component to contact the roof 12 of the tower 14.

The biasing tips 230 of the plurality of threaded separation tools 228 prevent the full magnetic attraction force between the magnets 214 and the roof 12 from engaging nearly instantaneously. With the separation tools 228 in position the installer can first move the shoe members 120, 122, plate member 198 and the plurality of magnets 200 attached thereto to an optimal position and orientation before permitting the magnets to magnetically engage the roof 12.

Once the plate member 198 and the plurality of magnets 200 attached to the plate member 198 are in the desired position, the installer slowly backs out each of the threaded separation tools 228 thereby allowing the plurality of powerful magnets 200 to engage the roof 12 less abruptly than if manually placed thereon. When seeking to extricate the plurality of magnets 200 from the strong magnetic attachment to the roof 12, such as for repair or removal of the apparatus 10, the separation tools 228 are threaded into the through holes 222 causing contact with the roof 12 and raising the plate member 198 and the plurality of magnets 200 off the roof 12 until the powerful magnetic attraction is overcome. When the tips of the threaded separation tools 228 are extended below the plane of the magnets 200, the separation tools 228 produce a stand-off gap which greatly reduces magnetic attraction of the surface plane of the tower.

The biasing tips 230 of the separation tools 228 prevent scratching and most importantly, penetrating the costly epoxy down to bare metal. The biasing tips 230 are preferably fabricated from a soft but durable engineered polymer. The biasing tips 230 facilitate the manual movement of the shoe members 120, 122 and the plate member 198 along with the plurality of magnets 200 to a more optimal position on the roof 12 without fear of damage to the epoxy. Furthermore, the quality of the low friction biasing tip allows the apparatus to be translated across the surface with reduced lateral force.

Figure 7:
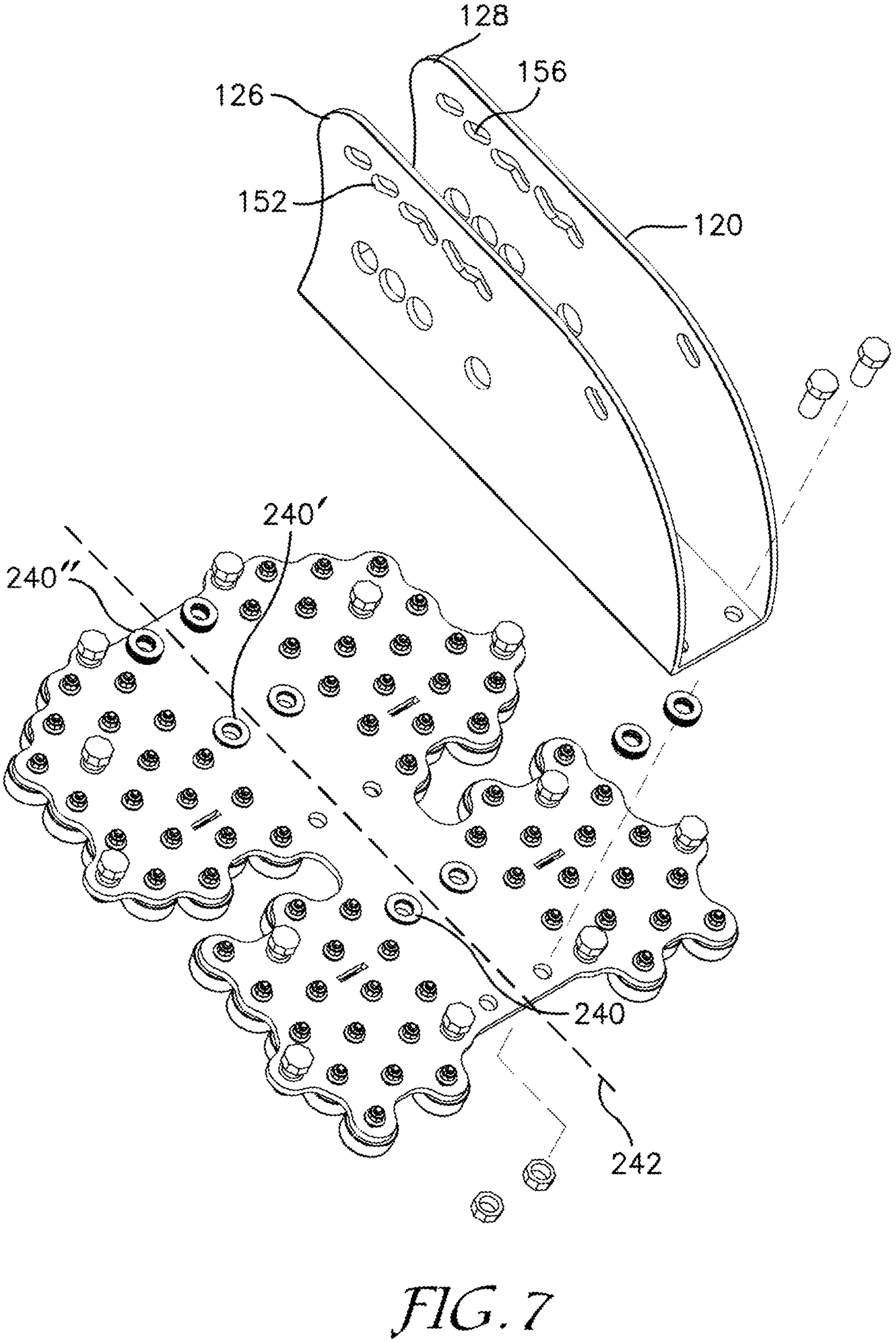
FIG. 7 illustrates a perspective view of an embodiment of gap alignment washers in position proximate the shoe member.

As previously detailed, considerable rotational flexure is available to the shoe members 120, 122 from the slots 152, 156, 182, 186 in the upwardly extending walls 126, 128. Moreover, gap alignment washers (shims) 240, as best illustrated at FIG. 7, are also available to the installer for inducing curvature into the longitudinal axis 242 of the plate member 198 to match the tangency curvature of the roof 12.

Additionally, and as an alternative, or in conjunction with, the washers (shims) 240, the plate member 198 may be precision machined on one side 198A to match the curvature of the roof 12 of the tower 14 thereby maximizing the magnetic pull of the magnets 200 when mounted to the roof 12. Moreover, with high resolution photogrammetry being employed in these applications and the use of digital twins, the plate member 198 may also be precision shaped to the curvature of the roof 12 with the aid of a hydraulic press. The custom bent plate member 198 may then have magnets 200 secured thereto for a precision fit to the roof 12.

In a preferred embodiment, the washers 240 are positioned beneath the center panel 124 and the plate member 198. Various heights of one or more stacks of washers 240, 240', 240" may be positioned between the center panel 124 and the plate member 198. Once the plate member 198 is drawn tight to the center panel 124 with fasteners 210 the plate member 198 is bent by the force of the fastener 210 advancing into the center panel 124. Alignment of the plate member 198 with the curvature of the roof 12 of the tower 14 enhances substantially the power of attraction of the magnets 200 to the roof 12.

Figure 7A:
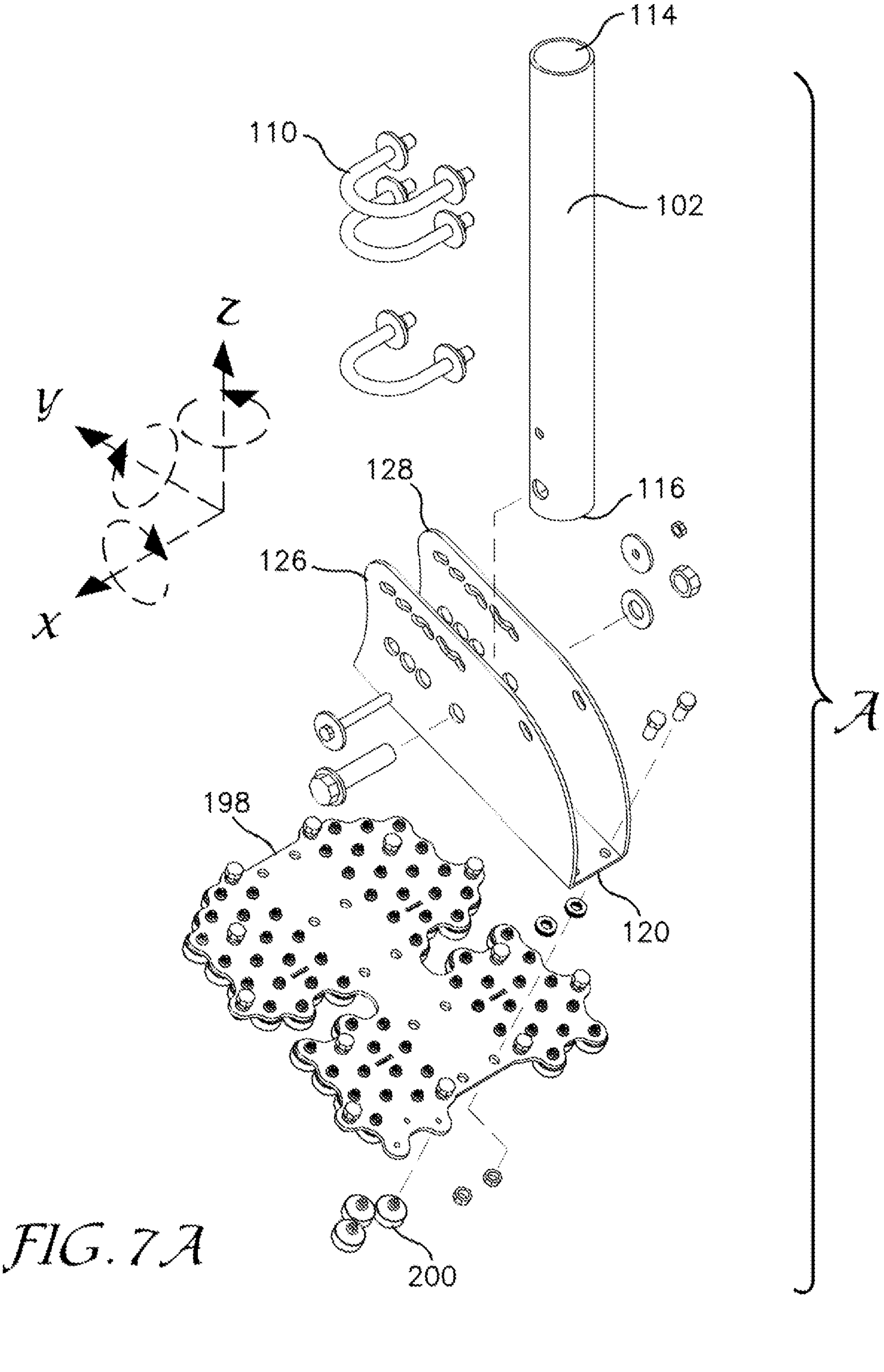
FIG. 7A illustrates an exploded view of an embodiment of a magnetic assembly including rod member, shoe member, plate member and magnets as well as a coordinate system aligned with the disclosed embodiment.

As best illustrated at FIG. 7A, along with reference to the coordinate system suspended in the figure, the shoe members 120, 122 with the plate member 198 and magnets 200 are capable of movement along at least five degrees of freedom. Specifically, the assembled unit A of rod member, shoe member, plate member and magnets can be translated along any of the Y and Z axes (by repositioning attachment hardware or elevating the rod member 102) and rotated about any of the X, Y and Z axes. This considerable flexibility of rotation and translation of the assembled unit A allows the assembled unit to maintain optimal contact with the roof 12 of the tower 14.

Another notable feature of the apparatus 10 as disclosed herein and as illustrated at FIG. 2 is the use of an analogue test pad 246. The analogue test pad 246 is preferably in the range of 6-10 inches in diameter and outfitted with one or more magnets 246A that are from the same batch lot as those used on the apparatus 10. The analogue test pad is positioned atop the roof 12 at the same time as the apparatus 10 and serves as an easily accessible analogue for the condition and magnetic performance of the magnets 200 of the apparatus 10.

The analogue test pad 246 can quickly be checked for signs of wear and magnetic attractive force when a maintenance crew ascends the tower 14. The analogue test pad 246 it outfitted with an indelible tag 246A that is securely attached to the pad. The indelible tag 246A includes text detailing the use of the test pad and that it is not to be disturbed by anyone other than an authorized representative of the telecommunications company.

Figure 8:
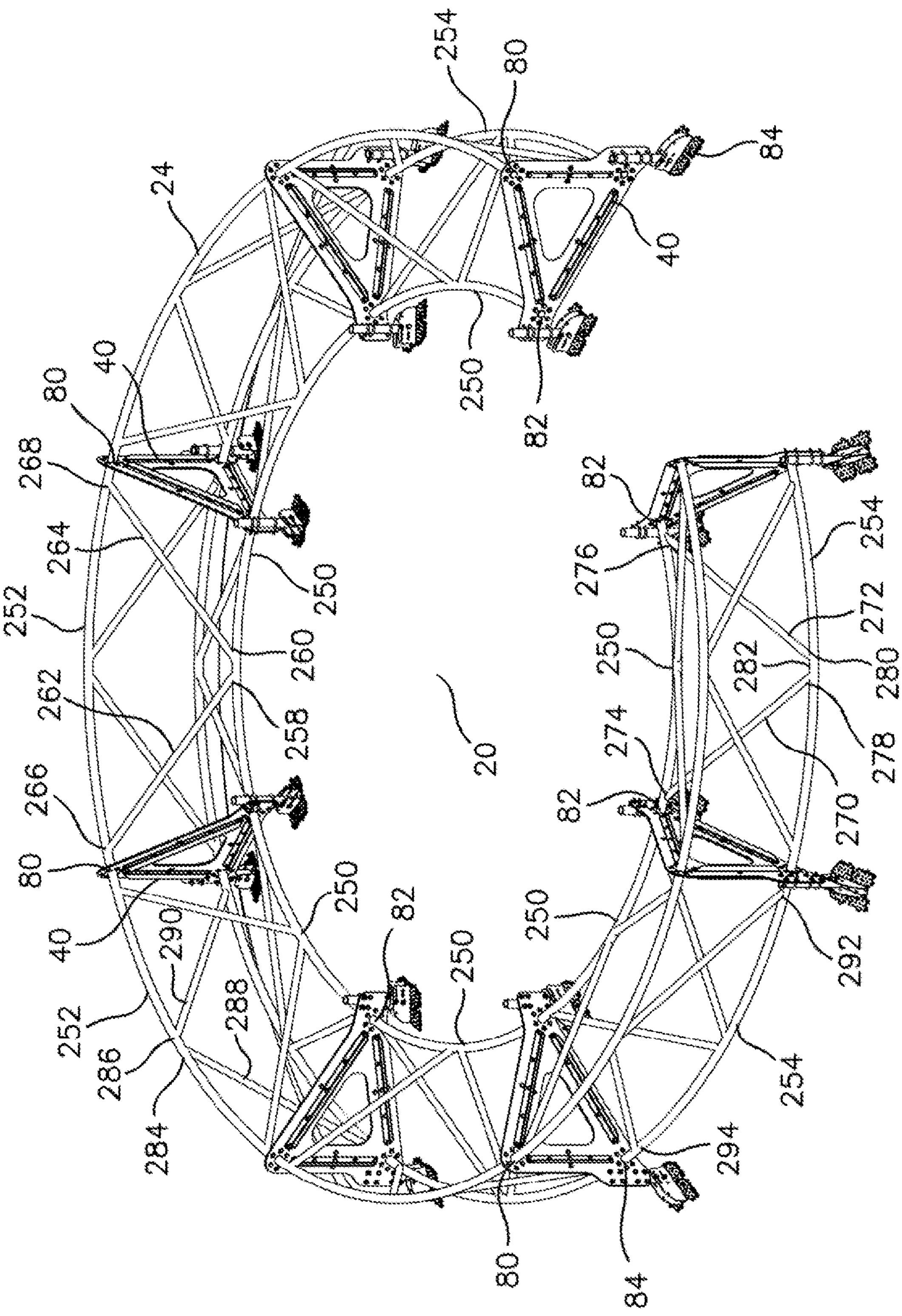
FIG. 8 illustrates a perspective view of an embodiment of the connecting members spanning between frame members.

The connecting members 24 as previously detailed, and as best illustrated at FIG. 8 are fabricated from circular cross-section tubular structural steel and span between the various frame members 40. In a preferred embodiment there are three primary spans 250, 252, 254 of connecting members 24 that traverse through the three through holes 80, 82, 84 in the frame members 40. As previously detailed, these connecting members 250, 252, 254 are preferably welded to the frame member 40 on each side of the frame member.

To provide additional rigidity to the three primary spans 250, 252, 254 of the connecting members 24, each primary span is double diagonally buttressed with secondary stiffening spans. The first connecting member primary span 250 nearest the center area 20 is buttressed proximate the center of the primary span 250 by the first ends 258, 260 of secondary connecting members 262, 264 with second ends 266, 268 that extend to near the through holes 80 of the uppermost primary connecting member 252 in the two adjacent frame members 40. The first and second ends 258,

260, 266, 268 of the secondary connecting members 262, 264 are preferably joined to the primary span 250 by welding.

The first connecting member primary span 250 is also diagonally buttressed by two secondary connecting members 270, 272 that span rearward to the third connecting member primary span 254. The first ends 274, 276 of the two secondary connecting members 270, 272 are connected to the primary span proximate the through holes 82, while the second ends 278, 280 of the two secondary connecting members 270, 272 are attached proximate the center 282 of the third primary connecting member 254. The first and second ends 274, 276, 278, 280 of the secondary connecting members 270, 272 are preferably joined to the first primary span 250 and the third primary 254 span by welding.

The second primary span 252 of the connecting members 24 traverses through the uppermost holes 80 in the frame members 40. The second primary span 252 is supported proximate the center of the span by the first ends 284, 286 of two secondary connecting members 288, 290. The second ends 292, 294 of the two secondary connecting members 288, 290 are preferably welded to the third primary connecting member 254 proximate the lower through holes 84 of the frame members 40.

Figure 9:
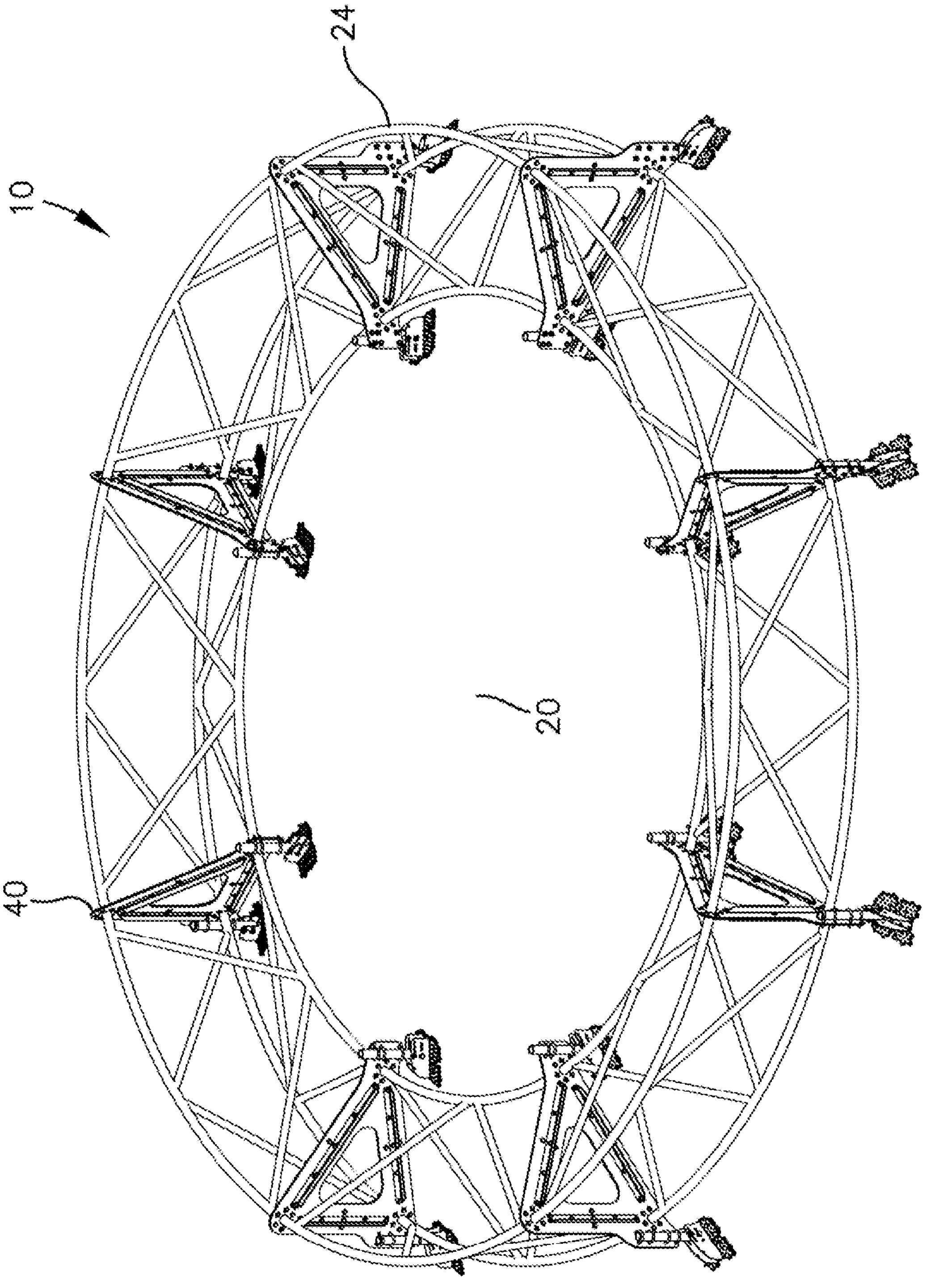
FIG. 9 illustrates a perspective view of an embodiment of a fully closed apparatus with no open sections.

The apparatus 10, as best illustrated at FIG. 9, a first embodiment may optionally be fully closed, meaning that connecting members 24 span between all frame members 40 without leaving an open section. This configuration of the apparatus provides very limited access to the center area 20 of the apparatus 10 effectively requiring, for example, an inspector to climb over the connecting members 24 and associated hardware 22.

Figure 10:
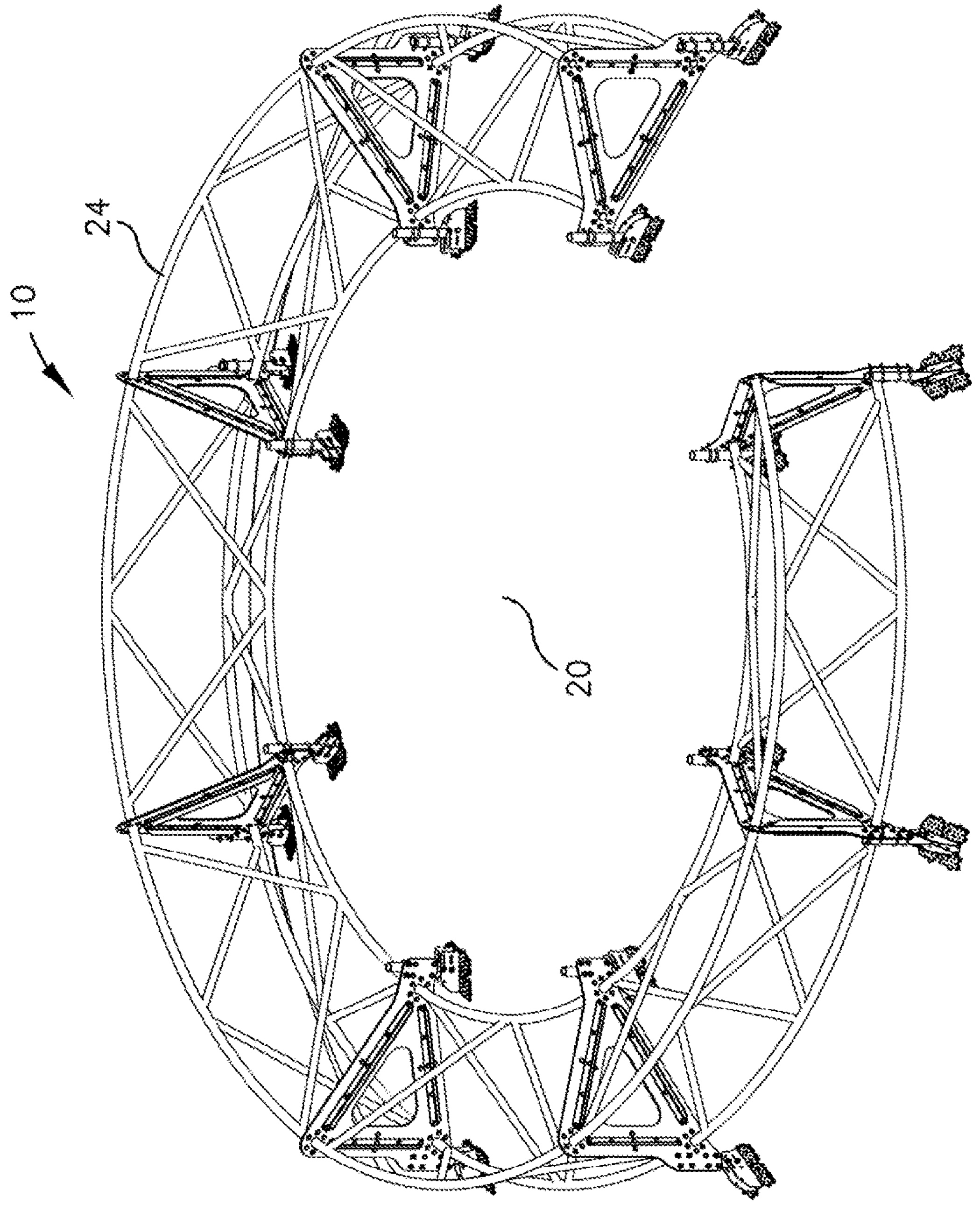
FIG. 10 illustrates a perspective view of an embodiment of an apparatus with a single open section.
Figure 11:
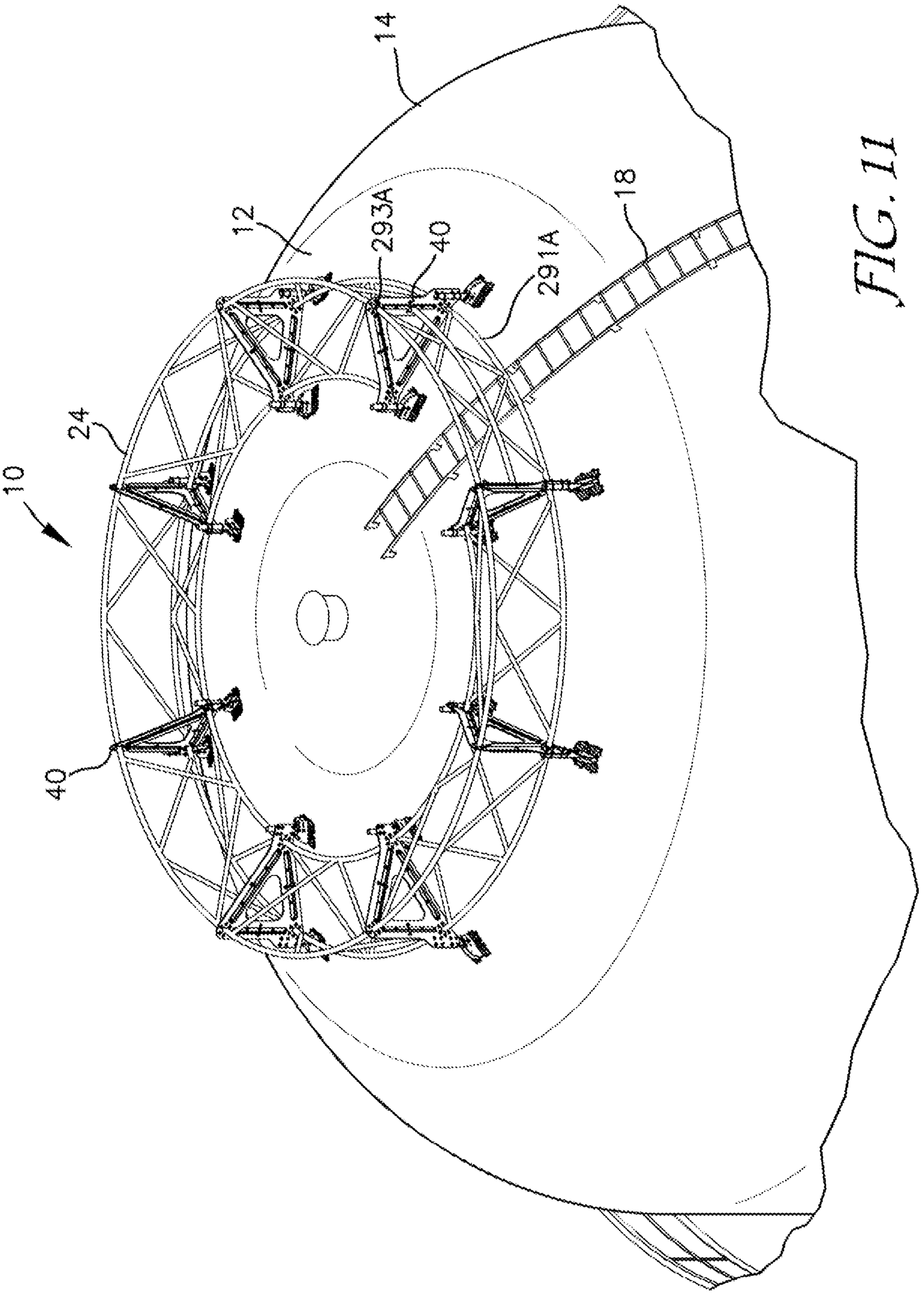
FIG. 11 illustrates a perspective view an embodiment of an apparatus with a single closed gate.
Figure 12:
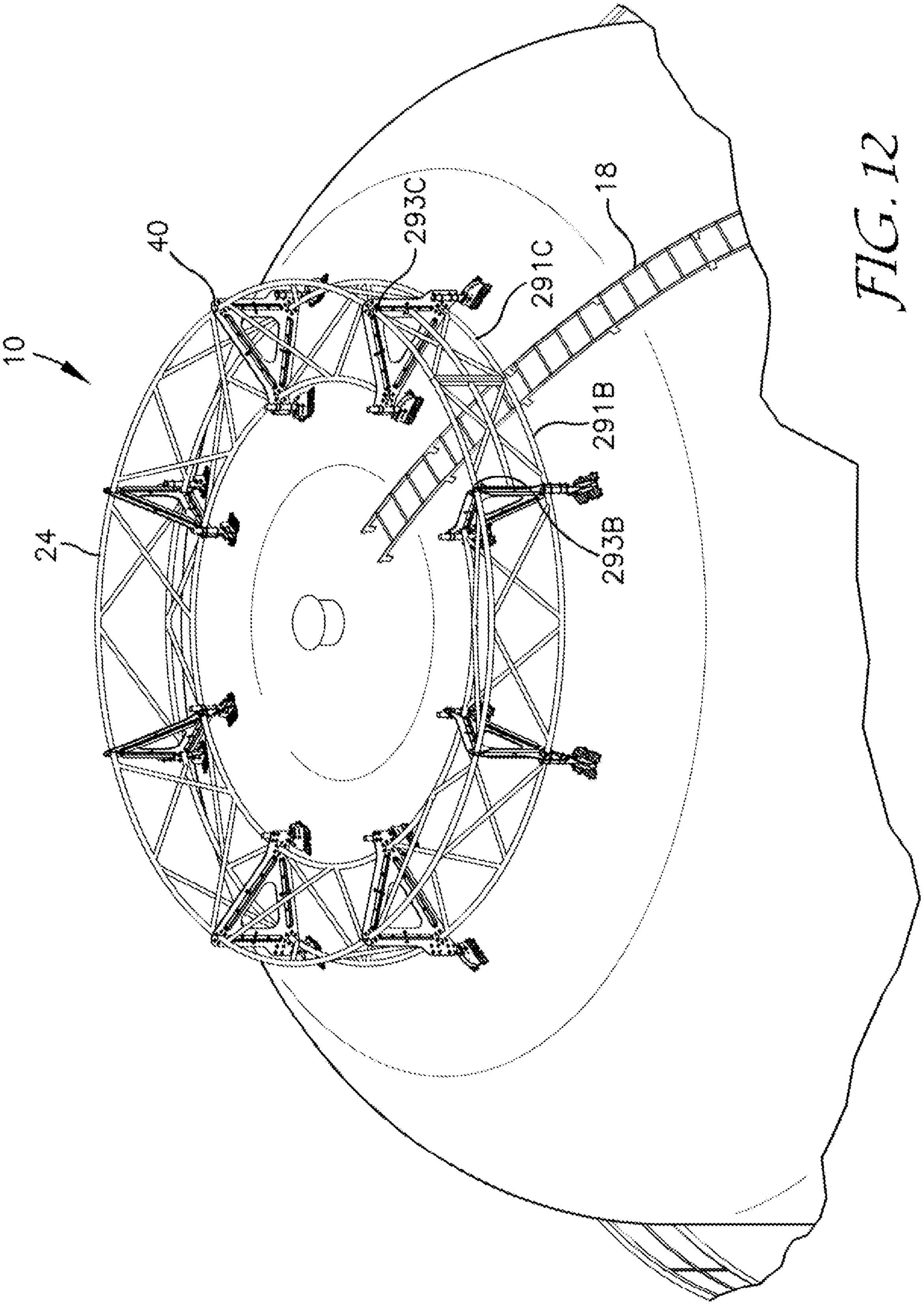
FIG. 12 illustrates a perspective view of an embodiment of an apparatus with closed double gates.

In a second embodiment as illustrated at FIG. 10, a section may remain unobstructed with connecting members 24 providing access to the center area 20. In a third embodiment as illustrated at FIG. 11, a gate 291A may be employed. The gate 291A is attached to a frame member 40 with hinges 293A. A fourth embodiment as illustrated at FIG. 12 utilizes two gates 291B, 291C that are each attached to separate frame members 40 with hinges 293B, 293C. The gates 291A, 291B and 291C are preferably fabricated in an OSHA compliant configuration and are lockable.

Figure 13:
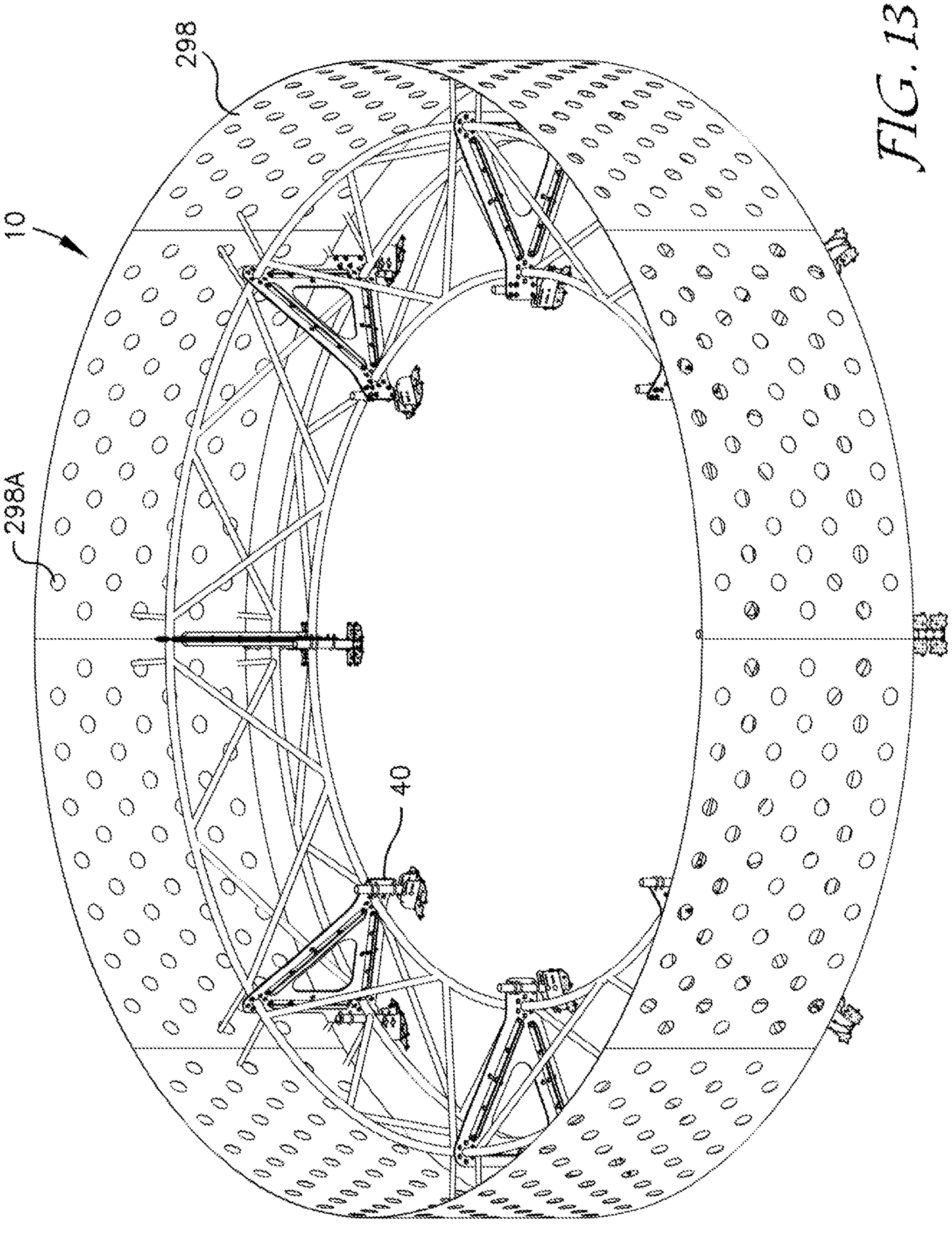
FIG. 13 illustrates a perspective view of an embodiment of an apparatus with concealment panels secured thereto.

As best illustrated at FIG. 13, an attribute that may be employed in some apparatus configurations is the use of one or more concealment panels 298. The concealment panels 298 allow the apparatus 10 and mounted hardware components 22 to be hidden behind a more aesthetic, blank structure. The concealment panels 298 are preferably fabricated from lightweight yet highly durable material and include open slats or perforations 298A to mitigate wind loading. The concealment panels 298 may also be color matched to the color of the tower 14 to avoid any unappealing color contrasts.

Figure 14:
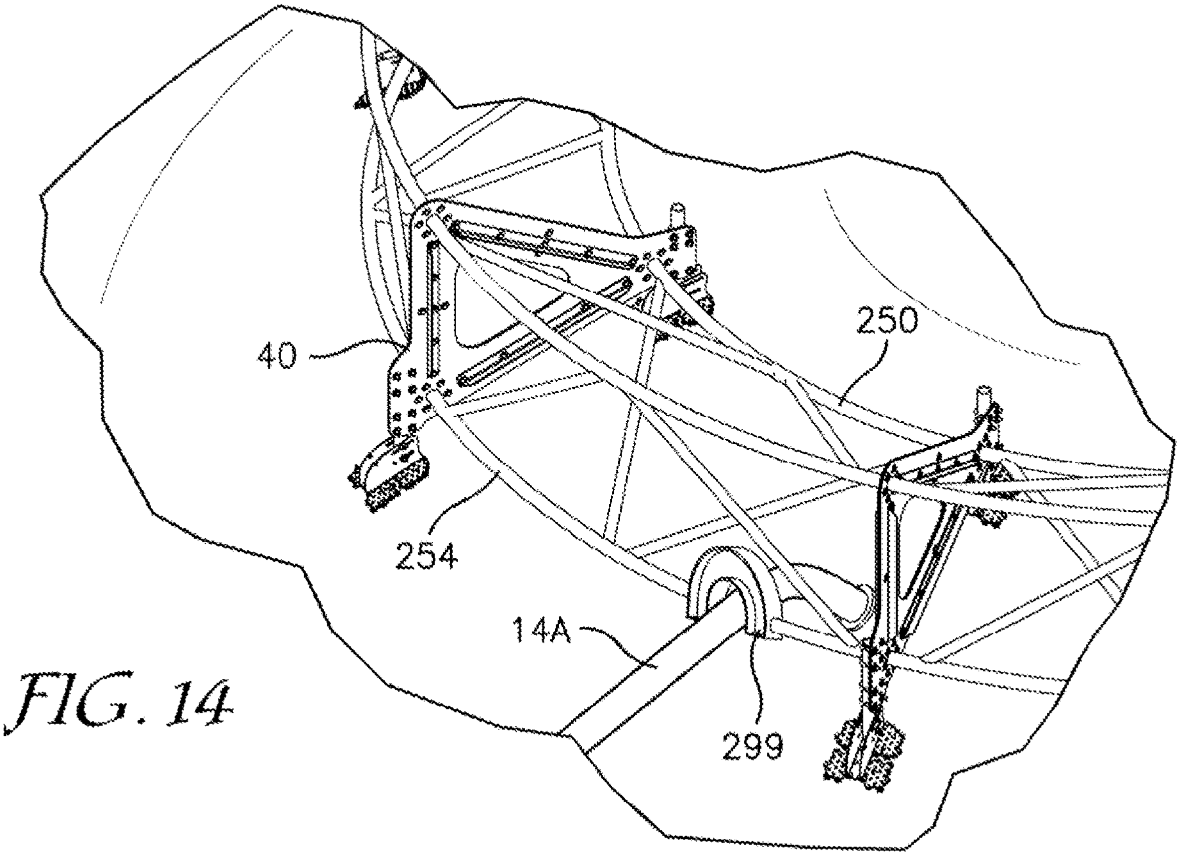
FIG. 14 illustrates a perspective view of an embodiment of an apparatus with an obstacle avoidance member.

As best illustrated at FIG. 14, the apparatus 10 may also employ an obstacle avoidance tube clearance member 299. The tube clearance member 299 is preferably utilized when the path of a water tower 14 overflow pipe 14A is obstructed by one or more primary connecting members 250, 254. The insertion of a clearance tube member 299 into the connecting members 250, 254 maintains the structural rigidity of the connecting members 250, 254 without having to cut or reposition the overflow pipe 14A.

Figure 15:
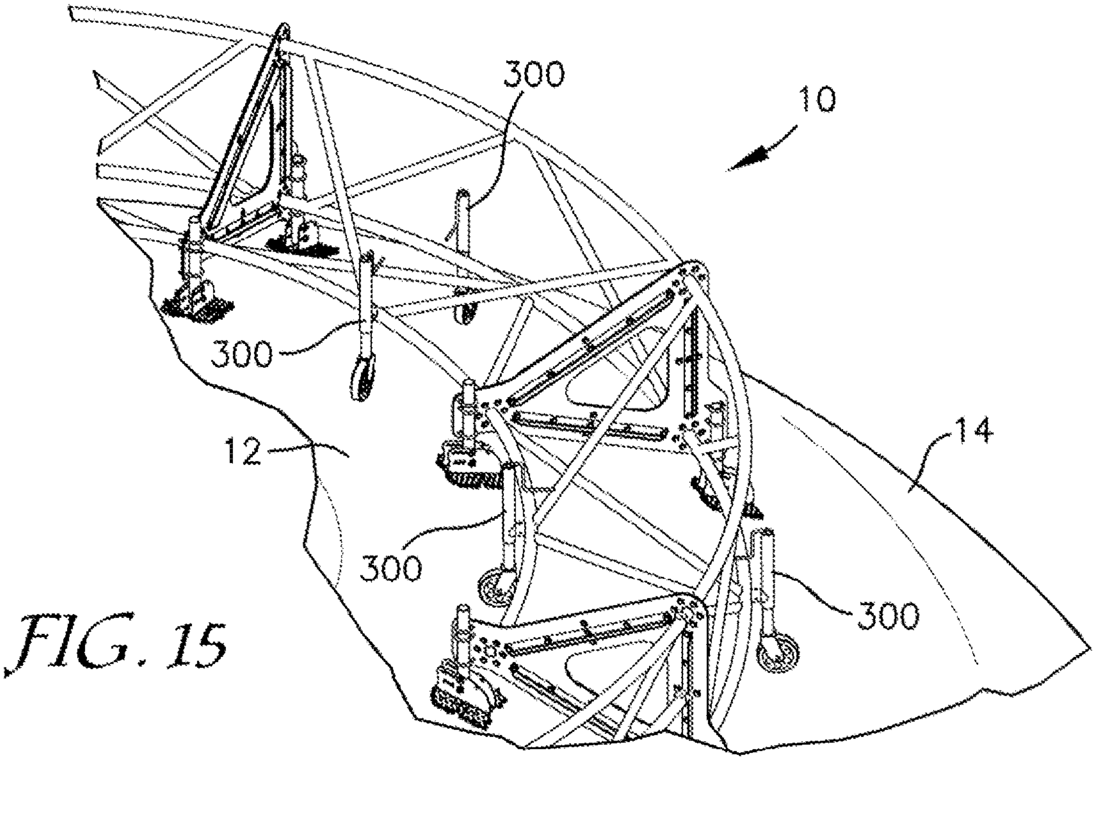
FIG. 15 illustrates a perspective view of an embodiment of the apparatus with jacks mounted to connecting members spanning between frame members.

Once the apparatus 10 is fully assembled in the configuration required to meet the telecommunications equipment supplier specifications, and before the separation tools 228 have been fully retracted from the holes 222 allowing the plurality of magnets 200 to engage the roof 12 of the tower 14 it is possible to move the entire assembled apparatus 10. The movement of a fully assembled apparatus 10 atop the tower 14 is possible with the use of a plurality of trailer jacks 300. These trailer jacks 300 utilizing larger diameter wheels that are preferably in the 4-to-6-inch diameter range. As best illustrated at FIG. 15, the trailer jacks 300 are positioned at approximately the center of each of the forward and rear connecting members 250, 254. A trailer jack 300 is positioned near the center of for each connecting member 250, 254 to prevent sagging of all the frame members 40 and inadvertent scratching of the epoxy.

Once the fully assembled apparatus 10 is over the desired position upon the roof 12 the jack stands 300 can be lowered, preferably in a synchronized fashion. Once the trailer jacks 300 are fully lowered, the operator can then retract the separation tools 228 from the through holes 222 thereby engaging the plurality of magnets 200 with the roof 12 of the tower 14.

Figure 16:
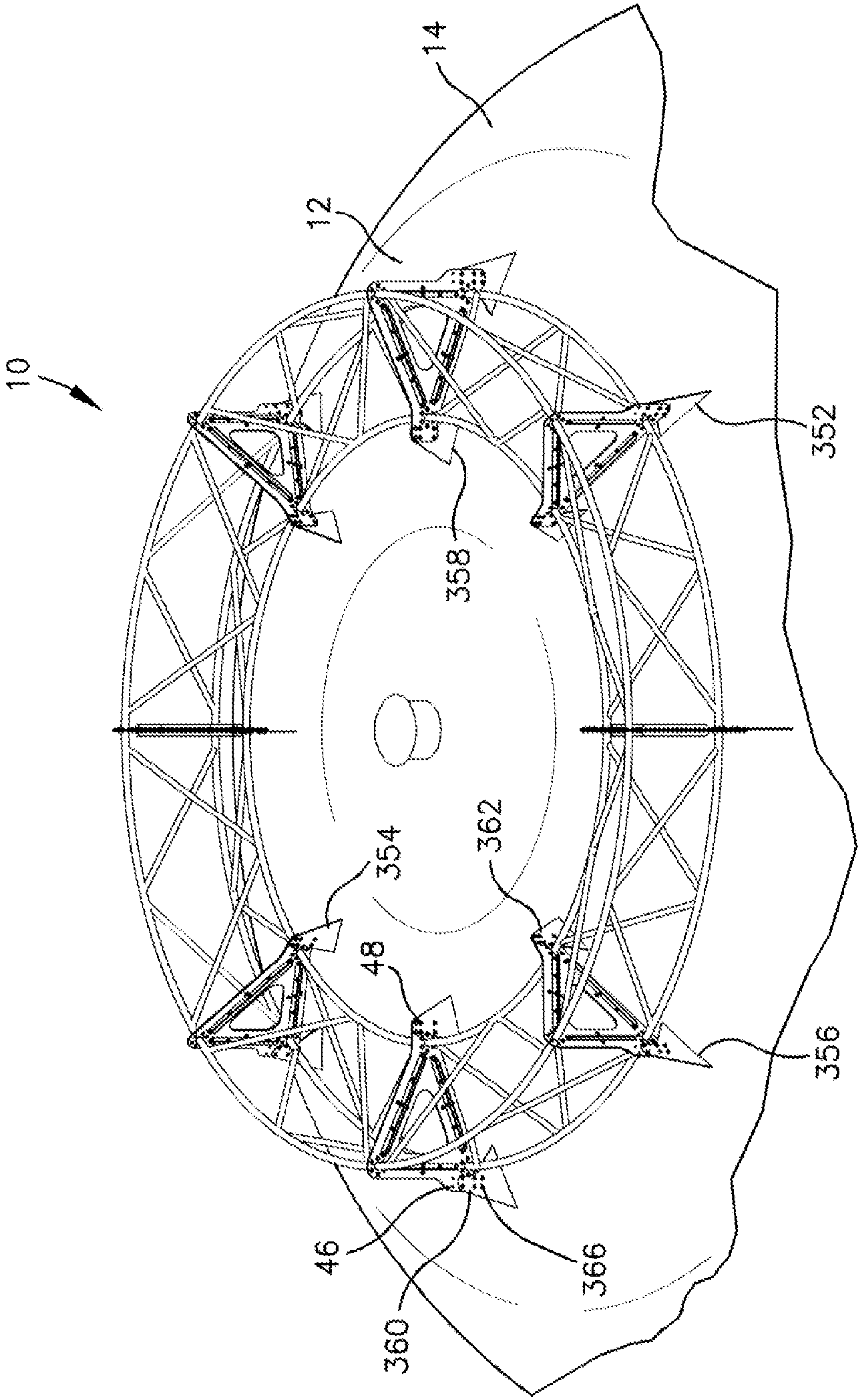
FIG. 16 illustrates a perspective view of an embodiment of a non-magnetic version of the apparatus.

A final embodiment of the apparatus 10 is employed when a water tower 14 renovation that includes removal of some, or all the coatings, i.e., epoxies, on the roof 12 of the water tower 14 is performed. With the bare metal of the roof 12 exposed the magnetic hardware elements of the apparatus 10 to include the rod members, shoe members 120, 122, plate members 198 and magnets 200 are eliminated and replaced with a first sheet plate member 352 and a second sheet plate member 354 as best illustrated at FIG. 16.

Both the first and second sheet plate members 352, 354 include an edge span 356, 358 and an upper locus 360, 362. The first and second sheet plate members 352, 354 are mounted respectively to the first and second end segments 46, 48 at the upper locus 360, 362. This mounting may optionally occur by either welding or attachment with fasteners 366. The edge span 356, 358 of the first and second sheet plate members 352, 354 are preferably secured to the roof 12 of the tower 14 by welding; however, it is contemplated that specially fabricated brackets may be utilized.

Each water tower 14 to be outfitted with the apparatus 10 will be pre-inspected by an inspector prior to installation. An initial assessment for the apparatus 10 may include such activities as; drone imagery, high-definition photos, photogrammetry, obtaining as-built blueprints for the tower owner, steel thickness testing, paint thickness testing, magnet testing for sheer and vertical pull force. Recording of the roof 12 size and radial curvature profile, paint color, brand and coatings type are all recorded.

The photogrammetry referenced above produces a high fidelity digital "twin" of an existing tower that can be ported into CAD software and used for fitting the apparatus to the curvature of the roof 12 of the tower 14. A structural and mount engineering firm will also receive this "digital twin" for use in evaluating the tower 14 and apparatus 10 for loading characteristics. The qualification assessment will require that the tower 14 be climbed by a qualified inspector equipped with an assessment kit and check list to secure the roof data detailed in the prior paragraph. The inspector will also ultrasonically measure steel plate thicknesses that are provided to the digital twin model.

The inspector will also take a series of paint thickness (dry-film thickness) measurements at specified areas. The inspector will then utilize a test magnetic pad to record the vertical maximum pull off strength at specified roof areas as well as the shear slide maximum pull force. These test parameters are modeled to yield loading characteristics of the apparatus 10 that are extremely accurate and provide measurements that are used to optimally match the curvature of the roof 12 of the tower 14.

The installation of the apparatus 10 is also guided by an installation check list and video. A live video link with engineering staff is also an option at any time to trouble shoot any issues that arise. The principal concerns at the time of installation are (i) correct orientation of the apparatus 10, (ii) the attached sector antennae, (iii) the avoidance of any surficial obstructions on the roof 12 that exist beneath the magnetic feet, (iv) mitigation of damage to the tower and tower coatings, and (v) assuring proximity of the magnetic feet to the curvature of the roof 12 of the tower 14.

Figure 17:
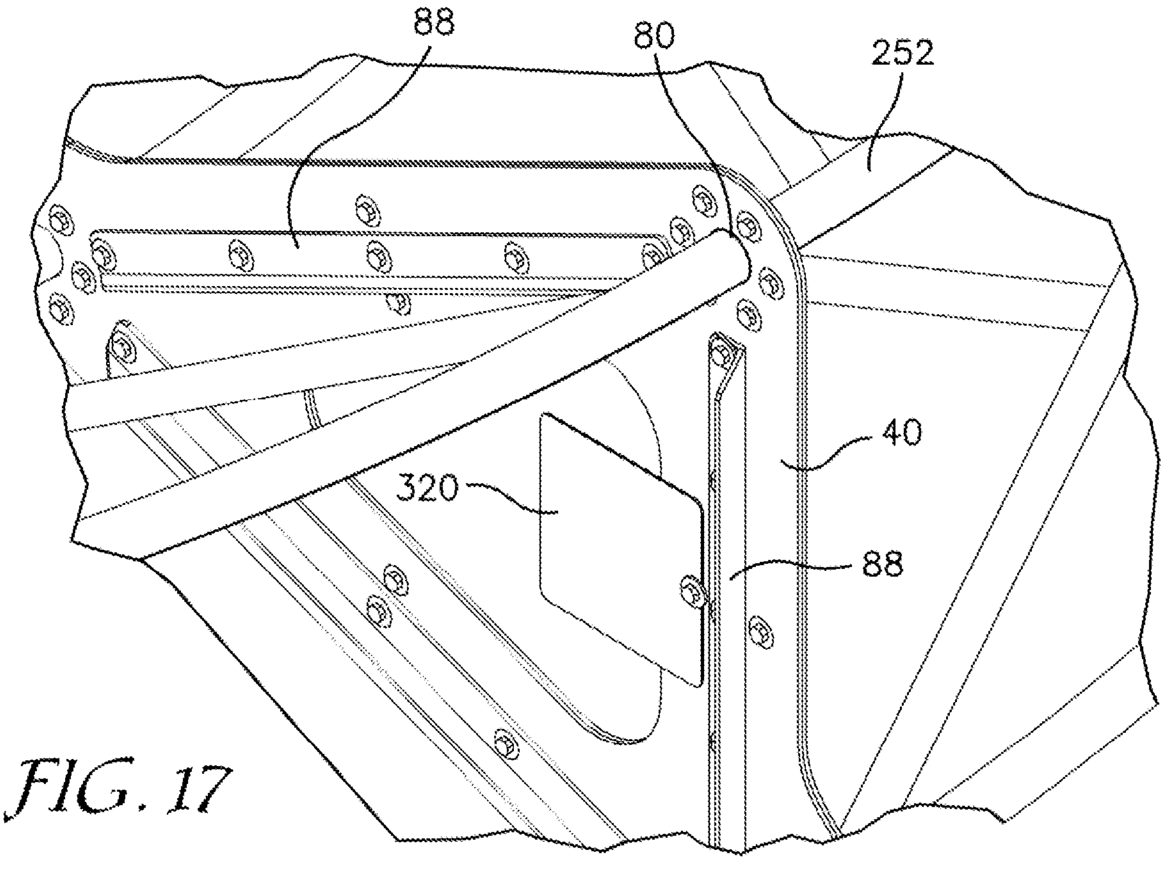
FIG. 17 illustrates a perspective view of an embodiment of a data plate attached to the apparatus.

As illustrated at FIG. 17, a data plate 320 will be installed on each apparatus 10 providing metadata on the apparatus 10. A separate warning plate will advise tower crews to avoid attaching additional hardware to the apparatus 10 without receiving appropriate authorization from the designer of the apparatus.

Complete construction and equipment plans must be submitted to the engineering team from each telecommunications carrier. First, the diameter of the apparatus 10 must be determined. It is important to note that the apparatus must be positioned to achieve an optimal roof pitch angle. This will optimize the performance of the integration of the apparatus 10 and the tower 14. Placement on a very flat/horizontal section of roof does not provide adequate vertical strength for the weight of the apparatus and equipment. Placement on the tower roof 12 at a sharp vertical angle can cause over-stress on the magnetic pads and hoop-stress on the apparatus 10 and may not provide optimal placement security. The size of the apparatus 10 will also be determined by the telecommunications carrier and take into consideration horizontal antenna spacing requirements.

The various embodiments of the apparatus detailed above provide a wide range of options for safely and quickly securing telecommunications hardware to structures such as water towers.

The disclosed apparatus should not be construed as limiting in any way. Instead, the present disclosure is directed toward all novel and nonobvious features and aspects of the various disclosed embodiments, alone and in various combinations and sub-combinations with one another. The disclosed apparatus and systems are not limited to any specific aspect or feature or combination thereof, nor do the disclosed embodiments require that any one or more specific advantages be present, or problems be solved.

In view of the many possible embodiments to which the principles of the disclosed invention may be applied, it should be recognized that the illustrated embodiments are only examples of the disclosure and should not be taken as limiting the scope of the invention. Rather, the scope of the invention is defined by the following claims. I therefore claim as my invention all that comes within the scope of these claims.

The disclosure presented herein is believed to encompass at least one distinct invention with independent utility. While the at least one invention has been disclosed in exemplary forms, the specific embodiments thereof as described and illustrated herein are not to be considered in a limiting sense, as numerous variations are possible. Equivalent changes, modifications, and variations of the variety of embodiments, materials, compositions, and methods may be made within the scope of the present disclosure, achieving substantially similar results. The subject matter of the at least one invention includes all novel and non-obvious combinations and sub-combinations of the various elements, features, functions and/or properties disclosed herein and their equivalents.

Benefits, other advantages, and solutions to problems have been described herein regarding specific embodiments. However, the benefits, advantages, solutions to problems, and any element or combination of elements that may cause any benefits, advantage, or solution to occur or become more pronounced are not to be considered as critical, required, or essential features or elements of any or all the claims of at least one invention.

Many changes and modifications within the scope of the instant disclosure may be made without departing from the spirit thereof, and the one or more inventions described herein include all such modifications. Corresponding structures, materials, acts, and equivalents of all elements in the claims are intended to include any structure, material, or acts for performing the functions in combination with other claim elements as specifically recited. The scope of the one or more inventions should be determined by the appended claims and their legal equivalents, rather than by the examples set forth herein.

Benefits, other advantages, and solutions to problems have been described herein regarding specific embodiments. Furthermore, the connecting lines, if any, shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

In the detailed description herein, references to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described relating to an embodiment, it is submitted that it is within the knowledge of one skilled in the art to affect such feature, structure, or characteristic relating to other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention has been described above with reference to one or more preferred embodiments, it will be appreciated that various changes or modifications may be made without departing from the scope of the invention as defined in the appended claims.

I claim:

1. An apparatus for securing hardware to a surface of a structure, the apparatus comprising:

at least two spaced apart frame members with first and second oppositely disposed end segments;

first and second rod members mounted to each of the at least two frame members respectively at the first and second oppositely disposed end segments, the first and second rod members each comprising an upper and a lower end;

a shoe member with a center panel and two opposed upwardly extending side walls, the shoe members mounted to the lower end of each of the first and second rod members;

a plate member mounted to a lower surface of the center panel;

at least one magnet mounted to a lower surface of the plate member; and a plurality of connecting members spanning between and interconnecting each of the frame members.

2. The apparatus of claim 1, wherein the hardware is at least one of a satellite dish, a directional antenna, a stick antenna, a cellular panel, a banner, lighting fixtures, cable trays, or rigging for maintenance purposes.

3. The apparatus of claim 1, wherein at least one U-bolt secures each rod member to the first and second end segments of the spaced apart frame members.

4. The apparatus of claim 1, wherein at least one stiffening rib is secured to each side of the spaced apart frame members.

5. The apparatus of claim 1, wherein a first fastener extends through a first through hole in the rod member proximate the second end of the rod member as well as the two opposed upwardly extending side walls of the shoe member thereby securing the shoe member to the rod member.

6. The apparatus of claim 5, wherein a second fastener extends through a curved slot within each of the upwardly extending walls of the shoe member and a second through hole in the rod member thereby limiting rotation of the shoe member to no more than about 10 degrees from horizontal in each direction.

7. The apparatus of claim 1, wherein the plate member comprises a cutout area on each side of the plate member proximate a midline, the cutout area operable to facilitate bending of the plate member along the midline to align the bifurcated plate members with the surface of the structure.

8. The apparatus of claim 1, wherein the plate member comprises at least one threaded opening for receiving a threaded separation tool with a biasing tip, the separation tool operable to separate the at least one magnet mounted to a lower surface of the plate member from connection to the surface of the structure and to facilitate an initial engagement of the at least one magnet to the surface of the structure.

9. The apparatus of claim 1, wherein the frame members are substantially triangular in configuration with a cutout in a center area of the frame member.

10. The apparatus of claim 1, wherein the plurality of connecting members spanning between each of the frame members are welded directly to each frame member on both sides of the frame member.

11. The apparatus of claim 1, wherein each frame member comprises first and second substantially identical frame plate members secured to one another with a plurality of threaded fasteners.

12. The apparatus of claim 1, wherein the apparatus comprises a plurality of spaced apart frame members with no connecting members spanning between two adjacent frame members to provide unimpeded access to an interior space of the apparatus.

13. The apparatus of claim 12, wherein a gate member is disposed between the two adjacent frame members with no connecting members spanning therebetween.

14. The apparatus of claim 13, wherein the gate member is a single gate member, the single gate member rotatably mounted to a single frame member.

15. The apparatus of claim 14, wherein the gate member comprises two opposed single gate members rotatably mounted one to each of the opposed adjacent frame members.

16. The apparatus of claim 1, wherein an analogue test pad is mounted adjacent the apparatus, the analogue test pad further comprising an indelible information tag.

17. The apparatus of claim 1, wherein an arched segment interrupting the span of at least one connecting member is operable to accommodate a roof obstruction.

18. The apparatus of claim 17, wherein the roof obstruction is an overflow pipe.

19. The apparatus of claim 1, wherein the hardware is mounted to the plurality of connecting members spanning between and interconnecting each of the frame members.

20. The apparatus of claim 1, wherein the center panel, the two opposed upwardly extending side walls and the plate member are coated with a radar absorbing material.

21. The apparatus of claim 1, wherein at least one concealment panel is mounted to the plurality of connecting members, the concealment panel operable to obscure the hardware mounted to the apparatus.

22. The apparatus of claim 1, wherein a plurality of threaded fastener members is operable to secure the plate member to the center panel of the shoe member.

23. The apparatus of claim 22, wherein at least one shim is disposed between the center panel of the shoe member and the plate member prior to advancement of the plurality of the threaded fastener members.

24. The apparatus of claim 23, wherein upon incremental advancement of the plurality of threaded fastener members the plate member plastically deforms against the at least one shim resulting in plate member curvature aligned with a curvature of the roof of the structure.

25. The apparatus of claim 1, wherein the plate member comprises an upper surface and a lower surface, the lower surface precision milled to correspond to the curvature of the roof of the structure at a specific location thereon.

26. An apparatus for magnetically mounting hardware to a surface of a structure, the apparatus comprising:

a plurality of spaced apart frame members with first and second oppositely disposed end segments and a plurality of through holes in each of the frame members;

first and second rod members slidably mounted to respectively at the first and second oppositely disposed end segments, the first and second rod members each comprising an upper end and a lower end;

at least two shoe members each with a center panel and two opposed side walls extending upwardly from laterally opposed edges of the center panel, a separate shoe member mounted proximate to the lower end of each of the first and second rod members;

a plate member mounted to a lower surface of each of the center panels;

at least one magnet mounted to a lower surface of each plate member; and a plurality of connecting members spanning between and interconnecting each of the frame members, a separate connecting member passing through each of the plurality of through holes in each of the frame members, wherein the apparatus is operable for magnetically mounting to the surface of the structure.

27. The apparatus of claim 26, wherein the plurality of spaced apart frame members each comprise a substantially triangular shaped body with a triangular shaped cutout within the triangular shaped body.

28. The apparatus of claim 27, wherein at least one stiffening rib is secured proximate to each edge of the triangular shaped cutout of the spaced apart frame members.

29. The apparatus of claim 26, wherein the plate member comprises laterally opposed cutout areas on each side of the plate member proximate a midline, the cutout area operable to facilitate manual bending of the plate member along the midline to align the bisected plate members for maximum contact with the surface of the structure.

30. The apparatus of claim 26, wherein the structure is a water tower.

31. The apparatus of claim 26, wherein a first fastener extends through a first through hole in the rod member as well as the opposed upwardly extending side walls of the shoe member securing the shoe member to the rod member.

32. The apparatus of claim 31, wherein a second fastener extends through a slot within each of the upwardly extending walls of the shoe member and a second through hole in the rod member thereby limiting rotation of the shoe member to no more than about 10 degrees from horizontal in each direction.

33. The apparatus of claim 26, wherein a curved connecting member is received into each of the plurality of through holes in each of the frame members.

34. The apparatus of claim 26, wherein an uppermost connecting member spanning between and interconnecting each of the frame members is elevated less than 55 inches from the surface of the structure.

35. The apparatus of claim 26, wherein the tops and sides of the plurality of magnets are encased in a hermetically sealed socket.

36. The apparatus of claim 26, wherein at least one gap alignment washer is inserted between an upper surface of each plate member and a lower surface of the center panel of the shoe member to optimally align the plate member with the curvature of the tower roof.

37. The apparatus of claim 26, wherein a plurality of horizontally offset antennas is transmitting and receiving a plurality of wireless frequency bands, the antennas are operable for colocation upon the apparatus.

38. The apparatus of claim 26, wherein a plurality of jacks mounted to the plurality of connecting members are operable to raise and lower the apparatus.

39. The apparatus of claim 26, wherein an auxiliary shoe member comprising first and second opposed side walls, a center panel and at least one magnet is secured to an underside of the center panel, the auxiliary shoe member being rotatably mountable to the shoe member.

40. The apparatus of claim 39, wherein the auxiliary shoe member further comprises a curved slot opening within an upper portion of the first and second side walls and a through hole opening disposed beneath the curved slot opening in each of the first and second side walls.

41. The apparatus of claim 40, wherein upper and lower openings are disposed within the opposed side walls of the shoe members, the upper and lower openings operable for alignment with the openings in the first and second side walls of the auxiliary shoe members.

42. The apparatus of claim 41, wherein the first and second side walls of each auxiliary shoe member are interposed between the opposed side walls of the respective shoe member.

43. The apparatus of claim 42, wherein a first fastener is received into the upper openings of the opposed side walls of the shoe member as well as the curved slot openings of the first and second walls of the auxiliary shoe members.

44. The apparatus of claim 42, wherein a second fastener is received into the lower openings of the opposed side walls of the shoe member as well as the through hole openings of the first and second side walls of the auxiliary shoe members.

45. The apparatus of claim 26, wherein the at least one magnet mounted to the lower plate member and the shoe member are operable for repositioning in at least five degrees of freedom.

46. The apparatus of claim 45, wherein the at least five degrees of freedom include translation along the X and Y axes as well as rotation about the X, Y and Z axes.

47. An apparatus for securing hardware to a surface of a structure, the apparatus comprising:

at least two spaced apart frame members with first and second oppositely disposed end segments;

at least one stiffening rib secured to each of the spaced apart frame members;

a first plate member and a second plate member each with an edge span and an upper locus, the first and second plate members mounted respectively to the first and second end segments at the upper locus;

the edge span of the first and second plate members secured to the surface of the structure; and a plurality of connecting members spanning between and interconnecting each of the frame members.

48. The apparatus of claim 47, wherein the at least one stiffening rib comprises an L-shaped member.

49. The apparatus of claim 47, wherein at least one stiffening rib is fabricated from mild steel.

* * * * *